(12) United States Patent
Toyodome et al.

(10) Patent No.: US 11,201,576 B2
(45) Date of Patent: Dec. 14, 2021

(54) MOTOR DRIVING APPARATUS AND REFRIGERATION CYCLE EQUIPMENT

(71) Applicant: Mitsubishi Electric Corporation, Tokyo (JP)

(72) Inventors: Shinya Toyodome, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/973,959

(22) PCT Filed: Jul. 26, 2018

(86) PCT No.: PCT/JP2018/028110
§ 371 (c)(1),
(2) Date: Dec. 10, 2020

(87) PCT Pub. No.: WO2020/021681
PCT Pub. Date: Jan. 30, 2020

(65) Prior Publication Data
US 2021/0257948 A1    Aug. 19, 2021

(51) Int. Cl.
*H02P 25/18* (2006.01)
*H02P 27/08* (2006.01)
*F24F 1/20* (2011.01)

(52) U.S. Cl.
CPC ............. *H02P 25/184* (2013.01); *F24F 1/20* (2013.01); *H02P 27/08* (2013.01); *H02P 2207/05* (2013.01)

(58) Field of Classification Search
CPC ...... H02P 1/00; H02P 1/04; H02P 1/12; H02P 1/16; H02P 1/163; H02P 1/18; H02P 1/24;
(Continued)

(56) References Cited

U.S. PATENT DOCUMENTS 8,098,035 B2 *   1/2012   Sekimoto ................ H02P 23/30
                                                        318/432
9,024,563 B2 *   5/2015   Bunte ..................... H02P 29/02
                                                        318/503
(Continued)

FOREIGN PATENT DOCUMENTS

JP      2008-228513 A    9/2008
JP      2016-86587 A    5/2016

*Primary Examiner* — Antony M Paul
(74) *Attorney, Agent, or Firm* — Posz Law Group, PLC

(57) ABSTRACT

In a motor driving apparatus including a DC power supply circuit of variable output voltage value, an inverter of variable frequency, and a connection switching device for selecting connection, switching of the connection switching device is performed in a state where an output voltage of the DC power supply circuit is increased, a rotational speed of a motor is increased, and a current flowing through the motor is made not greater than a predetermined threshold. For example, the switching of the connection switching device is performed in a state where the current through the motor is made zero. For example, the switching is performed in a state where the output voltage of the DC power supply circuit is set at a value corresponding to the rotational speed of the motor during the switching. It is possible to prevent increase in apparatus size and switch the connection of windings while the motor is rotating.

13 Claims, 19 Drawing Sheets

(58) Field of Classification Search
CPC ...... H02P 1/26; H02P 1/28; H02P 1/42; H02P 1/46; H02P 1/465; H02P 3/00; H02P 3/14; H02P 6/00; H02P 7/00; H02P 8/00; H02P 9/00; H02P 13/00; H02P 23/00; H02P 27/00; H02P 27/04; H02P 27/06; H02M 5/00; H02M 7/00
USPC .......... 318/400.01, 700, 701, 727, 800, 801, 318/430, 599, 811
See application file for complete search history.

(56) References Cited

U.S. PATENT DOCUMENTS

| | | | |
|---|---|---|---|
| 10,027,252 B2 * | 7/2018 | Taniguchi | ............... H02P 27/06 |
| 10,320,278 B2 * | 6/2019 | Araki | .................. H02M 7/5387 |
| 10,523,139 B2 * | 12/2019 | Cox | ........................ H02J 9/061 |

* cited by examiner

FIG. 15A
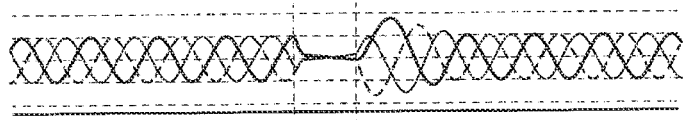
CURRENT THROUGH CONNECTION SWITCHING DEVICE 60
FIG. 15B
ZERO SELECTION SIGNAL Sz
FIG. 15C
CONNECTION SELECTION SIGNAL Sc
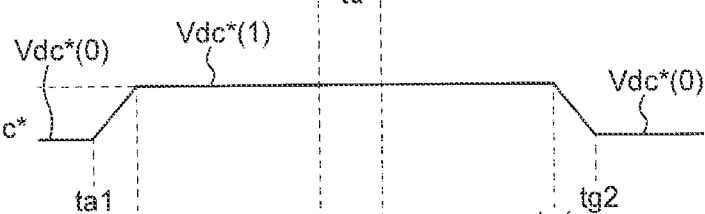
FIG. 15D
BUS VOLTAGE COMMAND VALUE Vdc*
FIG. 15E
FREQUENCY COMMAND VALUE ω*
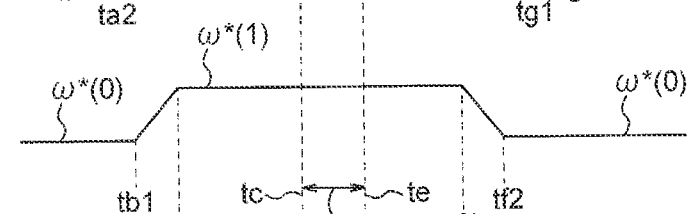
ZERO CURRENT CONTROL PERIOD
FIG. 16
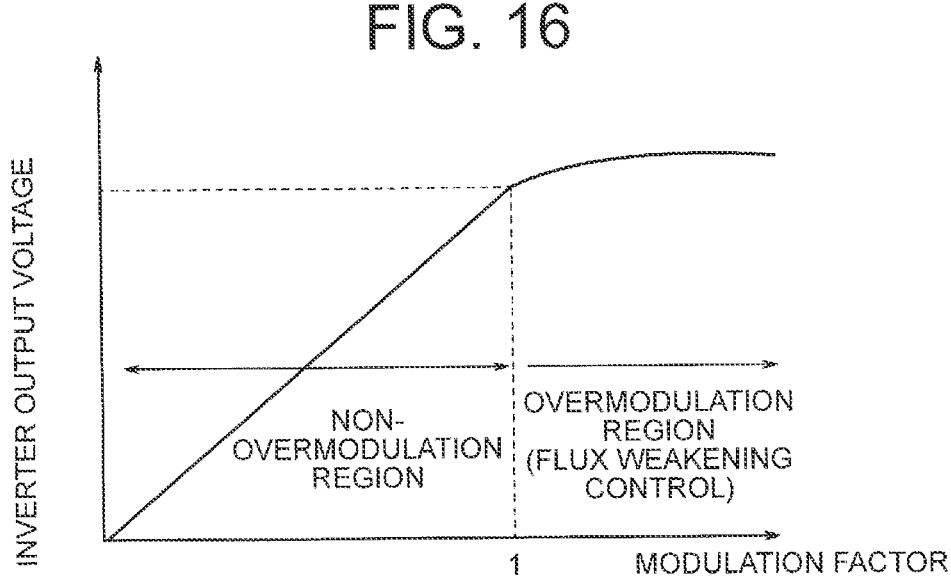

MOTOR DRIVING APPARATUS AND REFRIGERATION CYCLE EQUIPMENT

CROSS REFERENCE TO RELATED APPLICATION

This application is a U.S. national stage application of International Application No. PCT/JP2018/028110 filed on Jul. 26, 2018, the contents of which are incorporated herein by reference.

TECHNICAL FIELD

The present invention relates to a motor driving apparatus and refrigeration cycle equipment provided therewith.

BACKGROUND

It is conventionally proposed to prevent a large current from flowing instantaneously by switching the state of a motor driven by an inverter between star connection and delta connection while passing current through preparatory loads connected in parallel with windings (see, e.g., Patent Literature 1).

PATENT LITERATURE

Patent Literature 1: Japanese Patent Application Publication No. 2016-86587

In the technique described in Patent Literature 1, it is necessary to increase the power capacity of the preparatory loads under the condition in which the load is large and a large current flows, and there are problems, such as increase in apparatus size.

SUMMARY

The present invention has been made in view of the above, and is intended to provide a reliable motor driving apparatus capable of preventing increase in apparatus size and switching the connection of windings while a motor is rotating.

A motor driving apparatus according to the present invention includes: a DC power supply circuit to apply a DC voltage of variable voltage value to DC buses; an inverter to receive the DC voltage on the DC buses and apply an AC voltage of variable frequency and variable voltage value to a motor; and a connection switching device to switch connection of windings of the motor, wherein a transition is made from a first state in which a first connection is selected by the connection switching device, an output voltage of the DC power supply circuit is at a first voltage value, and a rotational speed of the motor is at a first speed value, to a second state in which the output voltage of the DC power supply circuit is higher than the first voltage value, the rotational speed of the motor is higher than the first speed value, and a current flowing through the motor is not greater than a predetermined threshold, and in the second state, the connection switching device performs switching from a state in which the first connection is selected to a state in which a second connection is selected.

With the present invention, it is possible to provide a reliable motor driving apparatus capable of preventing increase in apparatus size and switching the connection of windings while a motor is rotating.

BRIEF DESCRIPTION OF DRAWINGS

FIGS. 15A to 15E are waveform diagrams illustrating a control sequence in performing connection switching.

FIG. 16 is a diagram illustrating a relationship between a modulation factor and an output voltage of the inverter.

DESCRIPTION OF EMBODIMENTS

The following describes motor driving apparatuses according to embodiments of the present invention, and refrigeration cycle equipment provided therewith, with reference to the attached drawings. The present invention is not limited by the following embodiments.

An example of refrigeration cycle equipment is an air conditioner, and the following embodiments are those in which the present invention is applied to a driving apparatus for a motor that drives a compressor of an air conditioner.

First, a refrigeration cycle in an example of the air conditioner will be described with reference to FIG. 1.

Figure 1:
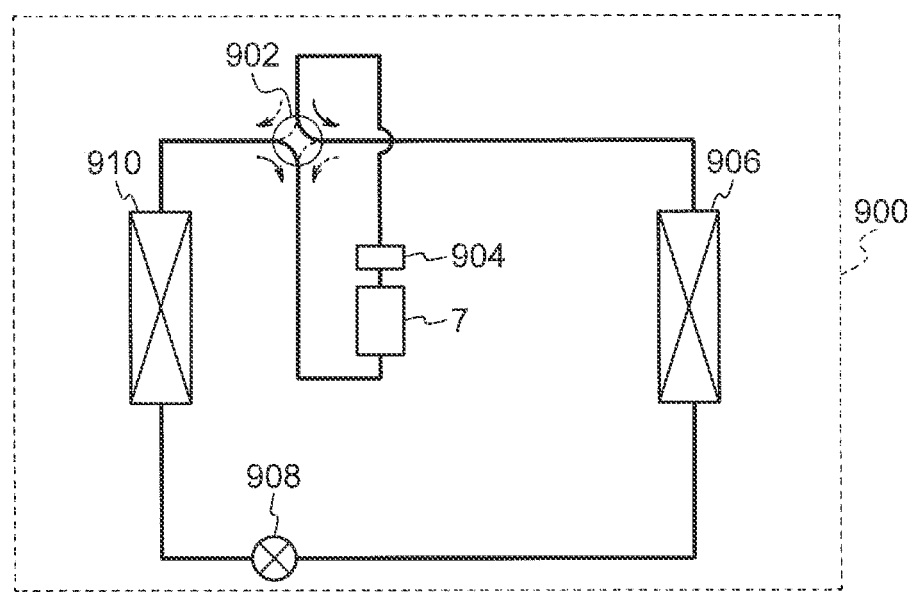
FIG. 1 is a schematic diagram illustrating an example of a refrigeration cycle of an air conditioner.

The refrigeration cycle 900 of FIG. 1 is capable of performing heating operation or cooling operation by switching operation of a four-way valve 902.

In the heating operation, as indicated by the solid arrows, a refrigerant is compressed and pumped out by a compressor 904, and returns to the compressor 904 through the four-way valve 902, an indoor heat exchanger 906, an expansion valve 908, an outdoor heat exchanger 910, and the four-way valve 902.

In the cooling operation, as indicated by the dashed arrows, the refrigerant is compressed and pumped out by the compressor 904, and returns to the compressor 904 through the four-way valve 902, outdoor heat exchanger 910, expansion valve 908, indoor heat exchanger 906, and four-way valve 902.

In the heating operation, the indoor heat exchanger 906 functions as a condenser and releases heat, and the outdoor heat exchanger 910 functions as an evaporator and absorbs heat. In the cooling operation, the outdoor heat exchanger 910 functions as a condenser and releases heat, and the indoor heat exchanger 906 functions as an evaporator and absorbs heat. The expansion valve 908 decompresses and expands the refrigerant.

The compressor 904 is driven by a motor 7 subjected to variable speed control.

First Embodiment

Figure 2:
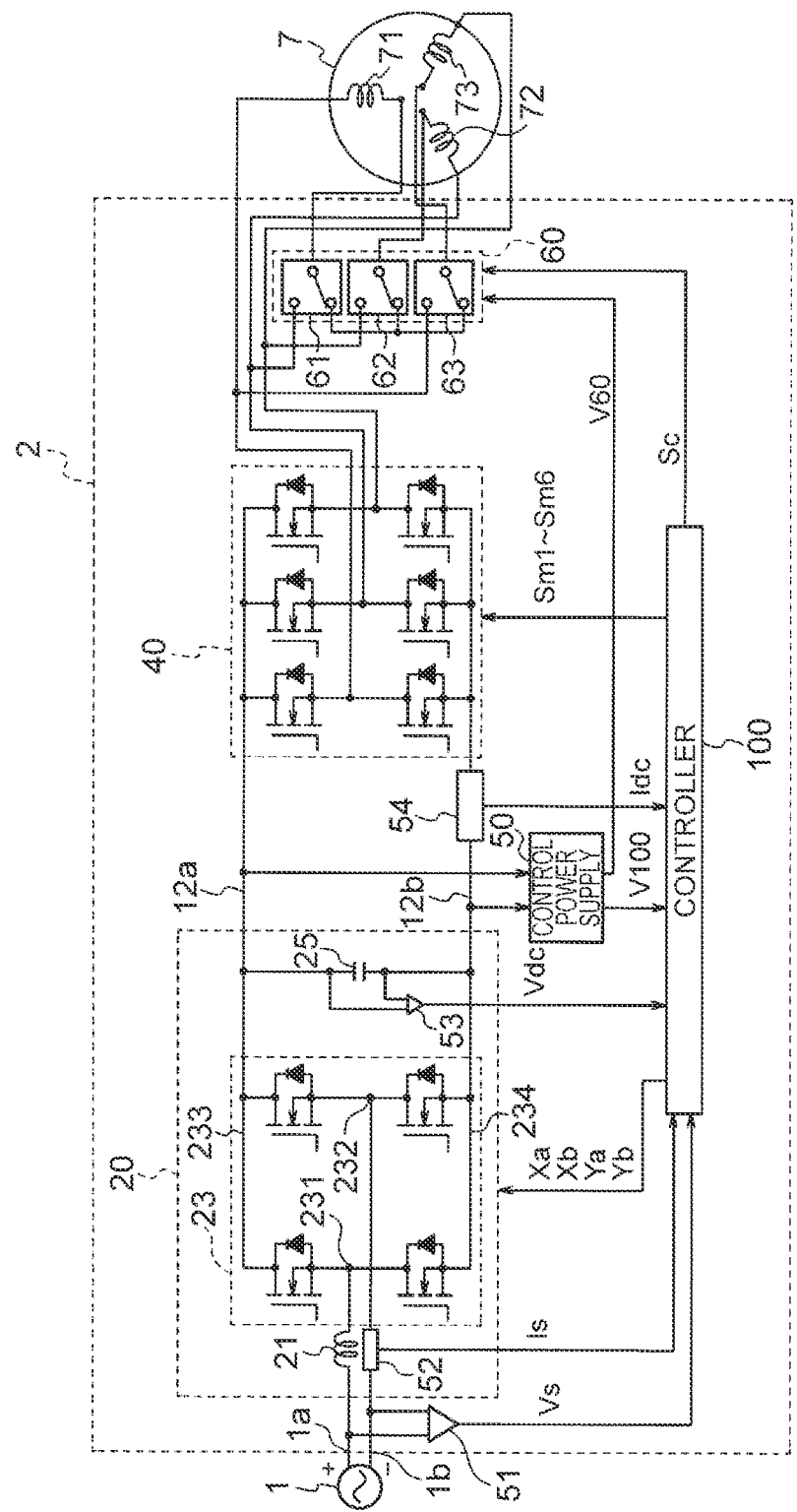
FIG. 2 is a diagram illustrating a motor driving apparatus of a first embodiment of the present invention.

FIG. 2 is a schematic wiring diagram illustrating a motor driving apparatus 2 of a first embodiment of the present invention.

The illustrated motor driving apparatus 2 is for driving the motor 7, and includes a direct-current (DC) power supply circuit 20, an inverter 40, a control power generation circuit 50, a power supply voltage detector 51, a power supply current detector 52, a bus voltage detector 53, a bus current detector 54, a connection switching device 60, and a controller 100.

The DC power supply circuit 20 receives an alternating-current (AC) voltage output from an AC power supply 1 and outputs a DC voltage of variable voltage value.

Hereinafter, the voltage output from the AC power supply 1 may be referred to simply as the "power supply voltage."

Figure 3:
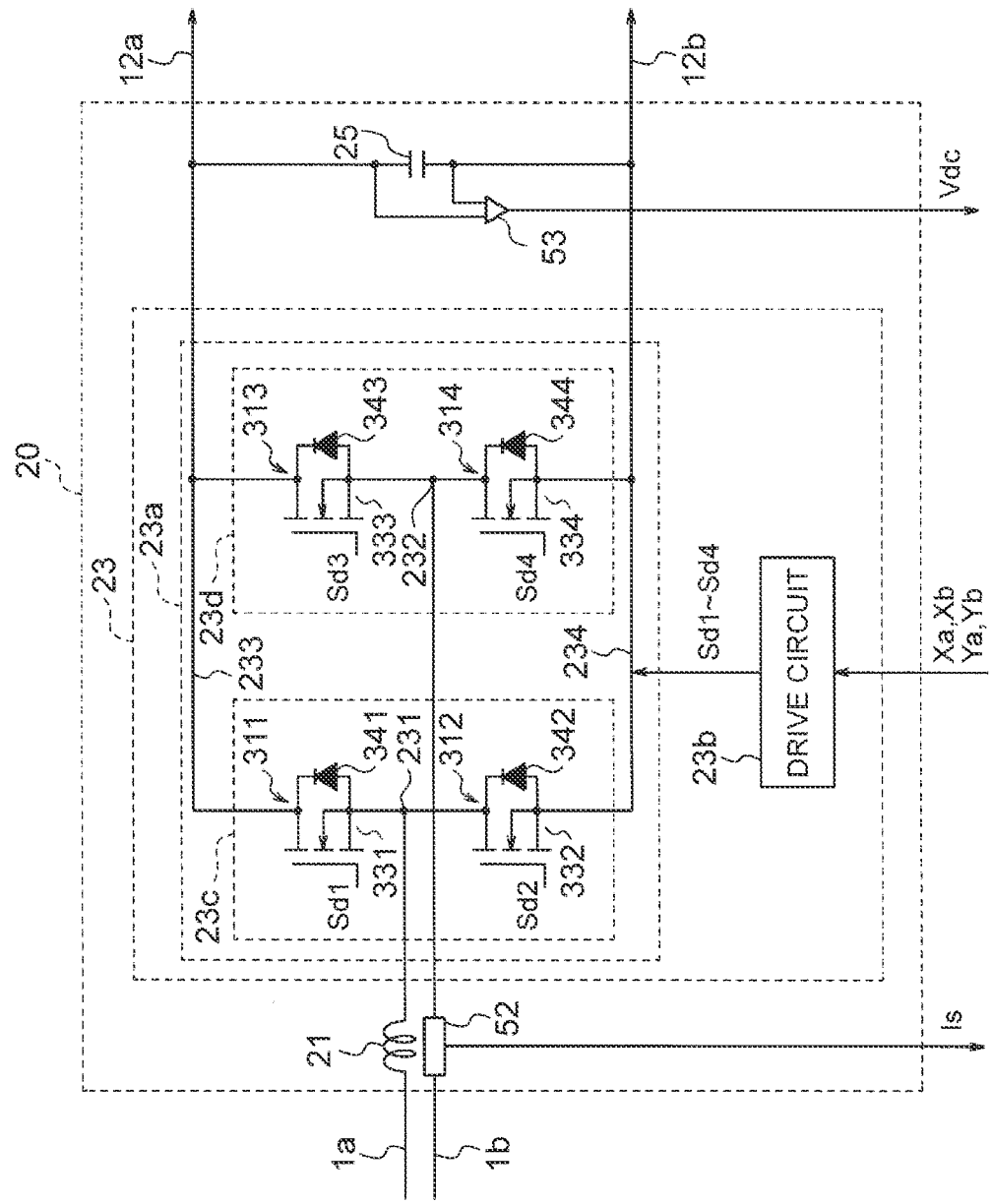
FIG. 3 is a diagram illustrating an example of a configuration of a DC power supply circuit used in the first embodiment.

The DC power supply circuit 20 includes a reactor 21, a bridge PWM converter 23, and a smoothing capacitor 25, as illustrated in FIG. 3.

The PWM converter 23 has a function of rectifying an AC voltage applied to first and second AC terminals 231 and 232 and a function of boosting the AC voltage, and outputs the rectified and boosted DC voltage through first and second DC terminals 233 and 234. The first DC terminal 233 is also referred to as a positive DC terminal, and the second DC terminal 234 is also referred to as a negative DC terminal.

The first AC terminal 231 is connected to a first terminal 1a of the AC power supply 1 through the reactor 21, and the second AC terminal 232 is connected to a second terminal 1b of the AC power supply 1.

The PWM converter 23 includes a converter main circuit 23a and a drive circuit 23b.

The converter main circuit 23a includes a first leg 23c and a second leg 23d.

The first leg 23c and second leg 23d are connected in parallel with each other between the DC terminals 233 and 234.

The first leg 23c includes an upper arm 311 and a lower arm 312 connected in series with each other. The second leg 23d includes an upper arm 313 and a lower arm 314 connected in series with each other. The connection point between the upper arm 311 and the lower arm 312 forms the AC terminal 231. The connection point between the upper arm 313 and the lower arm 314 forms the AC terminal 232.

The upper arm 311 includes a switching element 331 and a diode 341 connected in antiparallel with each other. The lower arm 312 includes a switching element 332 and a diode 342 connected in antiparallel with each other. The upper arm 313 includes a switching element 333 and a diode 343 connected in antiparallel with each other. The lower arm 314 includes a switching element 334 and a diode 344 connected in antiparallel with each other.

A switching element and a diode being connected in antiparallel indicates that they are connected in parallel so that the direction of current flowing through the switching element when the switching element is on is opposite to the direction of current flowing through the diode.

Each of the switching elements 331 to 334 is formed by, for example, a MOSFET. In this case, parasitic diodes included in the MOSFETs themselves may be used as the above diodes 341 to 344.

The drive circuit 23b generates drive signals Sd1 to Sd4 on the basis of PWM signals Xa, Xb, Ya, and Yb and controls turning on and off of the switching elements 331 to 334 with the drive signals Sd1 to Sd4, thereby causing the converter main circuit 23a to output a DC voltage Vdc of variable voltage value.

The drive signal Sd1 is for turning on the first switching element 331 only during periods in which it should be turned on and that are indicated by the PWM signal Xb.

The drive signal Sd2 is for turning on the second switching element 332 only during periods in which it should be turned on and that are indicated by the PWM signal Xa.

The drive signal Sd3 is for turning on the third switching element 333 only during periods in which it should be turned on and that are indicated by the PWM signal Ya.

The drive signal Sd4 is for turning on the fourth switching element 334 only during periods in which it should be turned on and that are indicated by the PWM signal Yb.

The smoothing capacitor 25 smooths the output voltage of the PWM converter 23.

One electrode of the smoothing capacitor 25 is connected to the first DC terminal 233 of the PWM converter 23 and a DC bus 12a on a high potential side (positive side).

Another electrode of the smoothing capacitor 25 is connected to the second DC terminal 234 of the PWM converter 23 and a DC bus 12b on a low potential side (negative side).

The voltage smoothed by the smoothing capacitor 25 and applied between the DC buses 12a and 12b is an output voltage of the DC power supply circuit 20. This output voltage will be referred to as the "bus voltage."

Figure 4:
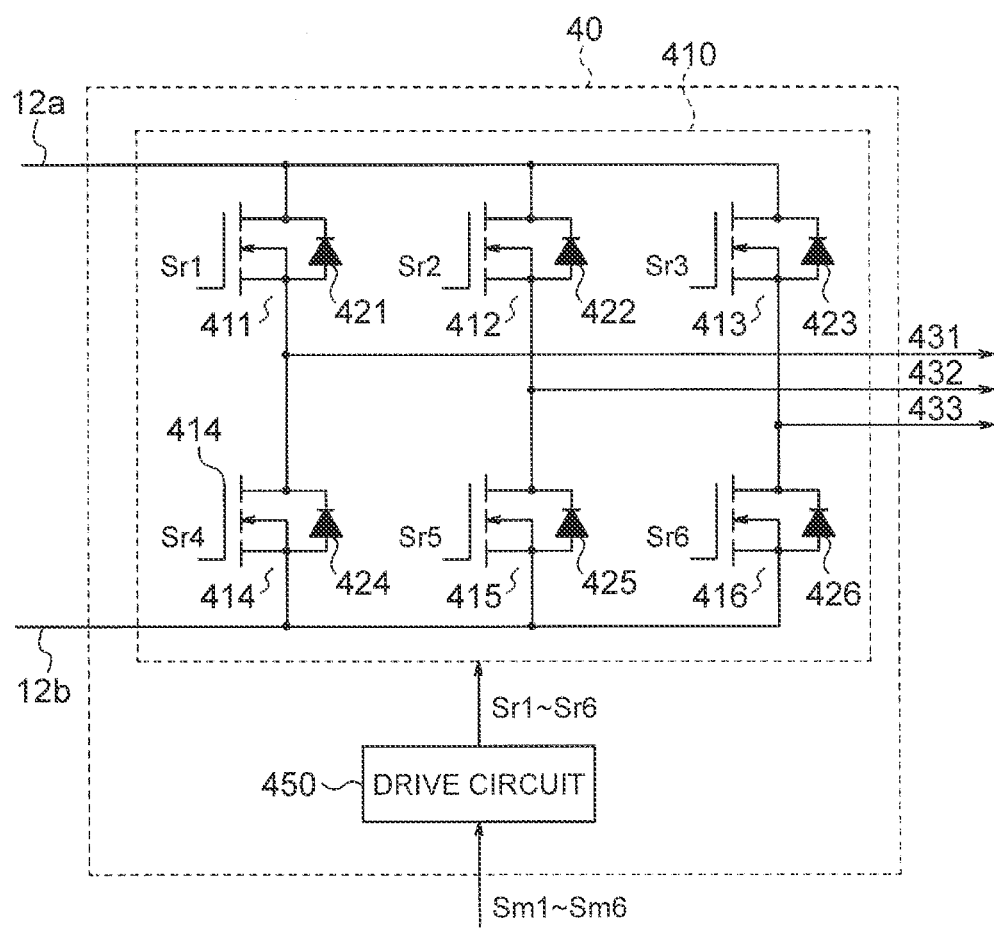
FIG. 4 is a diagram illustrating an example of a configuration of an inverter used in the first embodiment.

The inverter 40 includes an inverter main circuit 410 and a drive circuit 450, and input terminals of the inverter main circuit 410 are connected to the DC buses 12a and 12b, as illustrated in FIG. 4.

The inverter 40 is controlled by the controller 100, and switching elements 411 to 416 of six arms of the inverter main circuit 410 perform on-off operation, generate a three-phase AC current of variable frequency and variable voltage value, and supply it to the motor 7. Freewheeling rectifier elements 421 to 426 are connected in antiparallel with the switching elements 411 to 416.

Each of the switching elements 411 to 416 is formed by, for example, a MOSFET. In this case, parasitic diodes included in the MOSFETs themselves may be used as the above diodes 421 to 426.

The motor 7 is a three-phase permanent magnet synchronous motor, and has ends of stator windings drawn to the outside of the motor 7. The windings can be connected in star connection (Y-connection) and in delta connection (Δ-connection). The connection is selected by the connection switching device 60.

Figure 5:
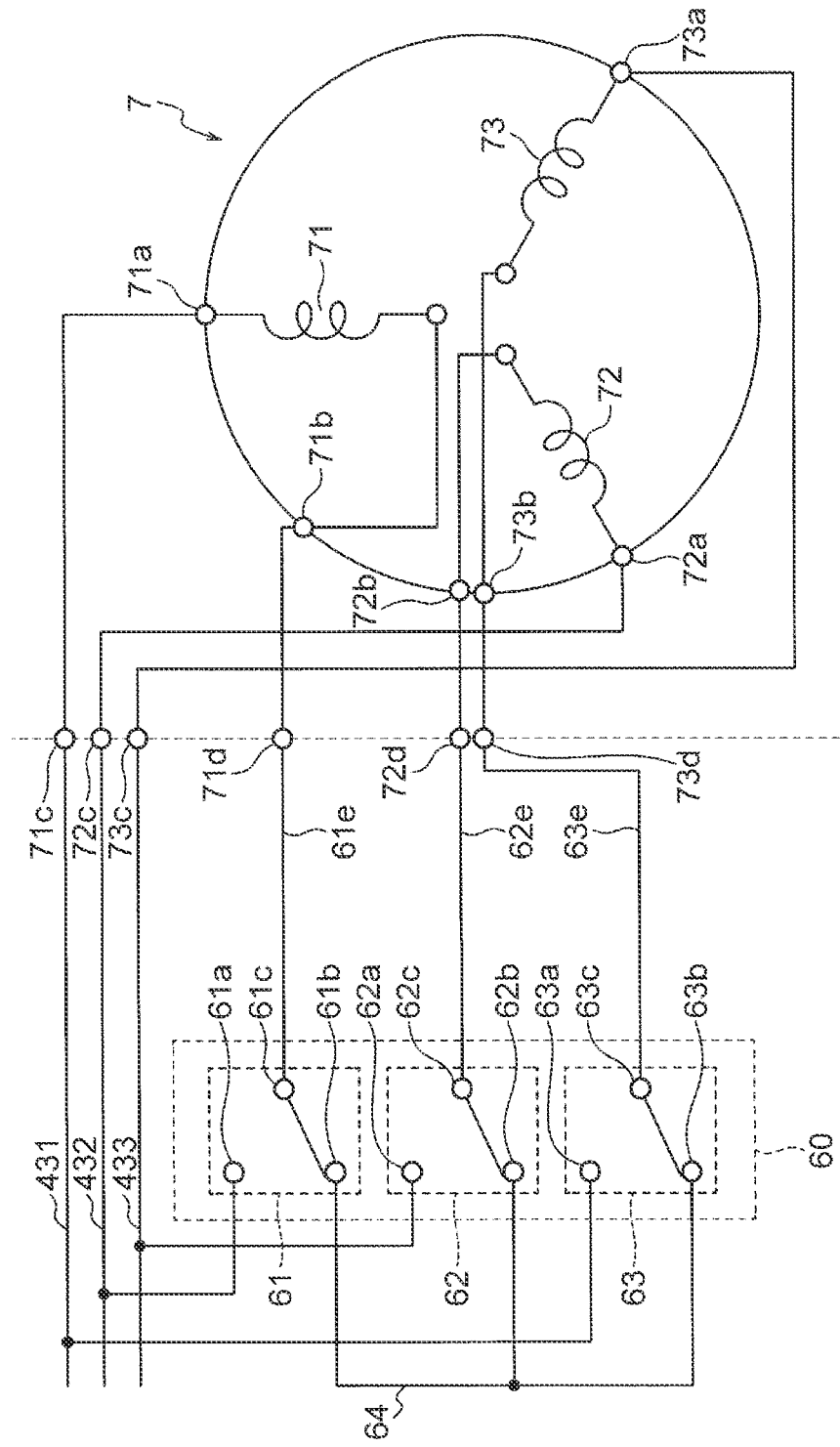
FIG. 5 is a wiring diagram illustrating in detail windings of a motor and a connection switching device illustrated in FIG. 2.

FIG. 5 illustrates in more detail the stator windings of the motor 7 and the connection switching device 60.

As illustrated, first ends 71a, 72a, and 73a of windings 71, 72, and 73 of three phases of U-, V-, and W-phases of the motor 7 are respectively connected to external terminals 71c, 72c, and 73c, and second ends 71b, 72b, and 73b of the windings 71, 72, and 73 of the U-, V-, and W-phases are respectively connected to external terminals 71d, 72d, and 73d, which allows the motor 7 to be connected to the outside. Output lines 431, 432, and 433 of the U-, V-, and W-phases of the inverter 40 are connected to the external terminals 71c, 72c, and 73c.

Figure 6:
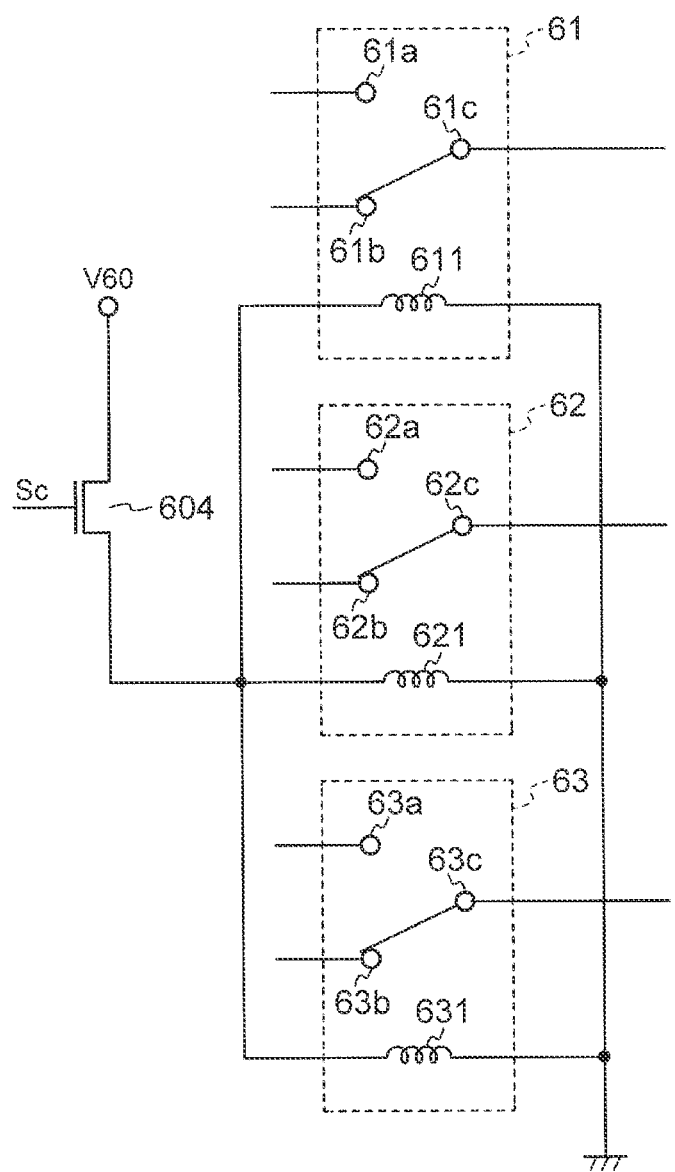
FIG. 6 is a wiring diagram illustrating in detail switches of the connection switching device illustrated in FIG. 5.

In the illustrated example, the connection switching device 60 is constituted by switches 61, 62, and 63. Currents flowing through the windings 71, 72, and 73 flow through the switches 61, 62, and 63, respectively. The switches 61, 62, and 63 switch the paths of the currents flowing through the windings 71, 72, and 73, respectively. As the switches 61, 62, and 63, electromagnetic contactors in which contacts are electromagnetically opened and closed are used. Such electromagnetic contactors include those referred to as relays, contactors, and the like, are configured, for example, as illustrated in FIG. 6, and have different connection states depending on whether current is flowing through exciting coils 611, 621, and 631.

The exciting coils 611, 621, and 631 are connected to receive a switching power supply voltage V60 (to be described later) through a semiconductor switch 604. Opening and closing of the semiconductor switch 604 are controlled by a connection selection signal Sc (to be described later) output from the controller 100. For example, when the connection selection signal Sc is at a first value (e.g., Low), the semiconductor switch 604 is off, and when the connection selection signal Sc is at a second value (e.g., High), the semiconductor switch 604 is on. When the connection selection signal Sc is output from a circuit having sufficient current capacity, it is also possible to directly apply the current of the signal Sc to the exciting coils 611, 621, and 631. In this case, the semiconductor switch 604 is not required.

A common contact 61c of the switch 61 is connected to the terminal 71d through a lead 61e, a normally closed contact 61b is connected to a neutral node 64, and a normally open contact 61a is connected to the V-phase output line 432 of the inverter 40.

A common contact 62c of the switch 62 is connected to the terminal 72d through a lead 62e, a normally closed contact 62b is connected to the neutral node 64, and a normally open contact 62a is connected to the W-phase output line 433 of the inverter 40.

A common contact 63c of the switch 63 is connected to the terminal 73d through a lead 63e, a normally closed contact 63b is connected to the neutral node 64, and a normally open contact 63a is connected to the U-phase output line 431 of the inverter 40.

When no current is flowing through the exciting coils 611, 621, and 631, the switches 61, 62, and 63 are in a state in which they are switched to the normally closed contact sides, i.e., the common contacts 61c, 62c, and 63c are connected to the normally closed contacts 61b, 62b, and 63b, as illustrated. In this state, the ends 71b, 72b, and 73b of the windings 71, 72, and 73 are connected with each other at the neutral node 64 through the switches 61, 62, and 63, and thus the motor 7 is in the state of Y-connection.

When current is flowing through the exciting coils 611, 621, and 631, the switches 61, 62, and 63 are in a state in which they are switched to the normally open contact sides, i.e., the common contacts 61c, 62c, and 63c are connected to the normally open contacts 61a, 62a, and 63a, contrary to the illustration. In this state, the ends 71b, 72b, and 73b of the windings 71, 72, and 73 are respectively connected to the ends 72a, 73a, and 71a of the windings 72, 73, and 71 through the switches 61, 62, and 63, and thus the motor 7 is in the state of Δ-connection.

Thus, when the connection selection signal Sc is at the first value, e.g., Low, the motor 7 is in the state of Y-connection, and when the connection selection signal Sc is at the second value, e.g., High, the motor 7 is in the state of Δ-connection.

Figure 7A:
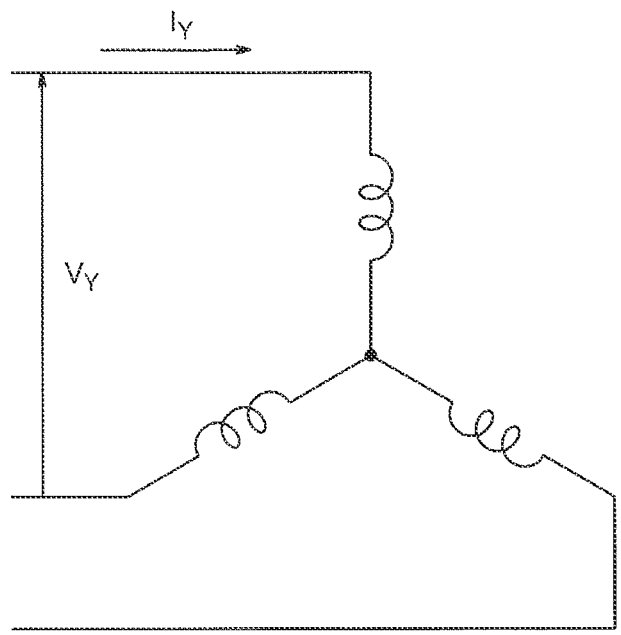
FIGS. 7A and 7B are diagrams conceptually illustrating states of the windings in different connections of the motor.
Figure 7B:
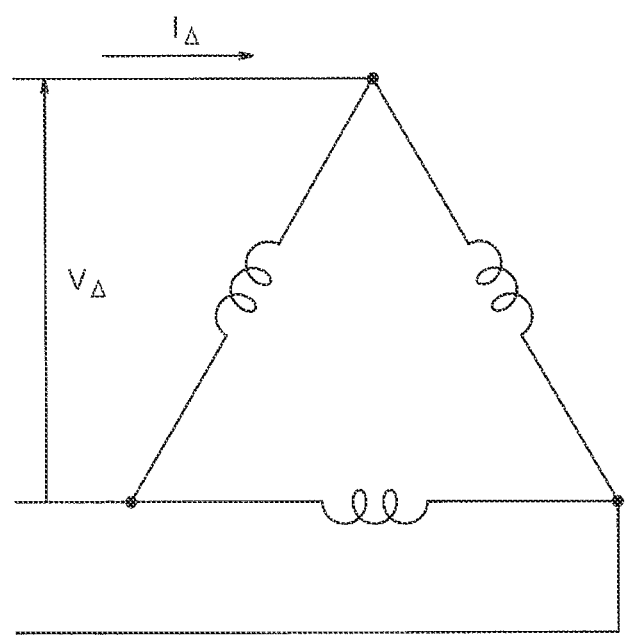

The following describes, with reference to FIGS. 7A and 7B, an advantage of using, as the motor 7, one capable of switching to one of Y-connection and Δ-connection.

FIG. 7A conceptually illustrates the connection state of the stator windings in Y-connection, and FIG. 7B conceptually illustrates the connection state of the stator windings in Δ-connection.

When it is assumed that the line voltage in Y-connection is $V_Y$, the current in Y-connection is $I_Y$, the line voltage in Δ-connection is $V_\Delta$, the current in Δ-connection is $I_\Delta$, and the voltages applied to the windings of the respective phases are equal to each other, the relationship $$V_\Delta = V_Y/\sqrt{3} \quad (1)$$

holds, and at this time, the relationship $$I_\Delta = \sqrt{3} \times I_Y \quad (2)$$

holds.

When the voltage $V_Y$ and current $I_Y$ in Y-connection and the voltage $V_\Delta$ and current $I_\Delta$ in Δ-connection have the relationships of equations (1) and (2), the powers supplied to the motor in Y-connection and in Δ-connection are equal to each other.

Thus, when the powers supplied to the motor are equal to each other, the current is greater and the voltage required for driving is lower in Δ-connection.

It is conceivable to select the connection depending on the load condition or the like by taking advantage of the above characteristic. For example, it is conceivable that when the load is low, low speed operation is performed in Y-connection, and when the load is high, high speed operation is performed in Δ-connection. This makes it possible to improve the efficiency at the time of low load and increase the output power at the time of high load.

This will be described below in more detail by taking a case of a motor for driving a compressor of an air conditioner.

As the motor 7 for driving a compressor of an air conditioner, a synchronous motor using a permanent magnet in a rotor is widely used to meet the demand for energy saving. Also, a recent air conditioner is configured to, when a room temperature is greatly different from a set temperature, rotate the motor 7 at high speed to rapidly bring it close to the set temperature, and when the room temperature is close to the set temperature, rotate the motor 7 at low speed to maintain the room temperature. In this case, the proportion of the time of the low speed operation is great.

In the case of using a synchronous motor, as the rotational speed increases, a back electromotive force increases, and a voltage value required for driving increases. The back electromotive force is greater in Y-connection than in Δ-connection, as described above.

To reduce the back electromotive force at high speed, it is conceivable to decrease the magnetic force of the permanent magnet or decrease the number of turns of the stator windings. However, such measures increase the current for producing the same output torque, thus increasing the current flowing through the motor 7 and inverter 40 and decreasing the efficiency.

Thus, it is conceivable to switch the connection depending on the rotational speed. For example, when the operation at high speed is required, Δ-connection is selected. Thereby, it is possible to reduce the voltage required for driving by $1/\sqrt{3}$ (compared to Y-connection). Thus, there is no need to reduce the number of turns of the windings, and there is also no need to use flux weakening control.

On the other hand, in low speed rotation, by selecting Y-connection, it is possible to reduce the current value by $1/\sqrt{3}$ compared to Δ-connection. Further, it becomes possible to design the windings to be suitable for driving at low speed in Y-connection, and it becomes possible to reduce the current value compared to the case of using Y-connection over the entire speed range. As a result, it is possible to reduce the loss of the inverter 40 and improve the efficiency.

As described above, it is meaningful to switch the connection depending on the load condition, and the connection switching device is provided to enable such switching.

The control power generation circuit 50 receives and steps down the voltage between both electrodes of the capacitor 25, i.e., the bus voltage Vdc, to generate a control power supply voltage V100 and the switching power supply voltage V60, and supplies the control power supply voltage V100 to the controller 100 and also supplies the switching power supply voltage V60 to the connection switching device 60.

The power supply voltage detector 51 is connected between the terminals 1a and 1b of the AC power supply 1. The power supply voltage detector 51 detects a power supply voltage Vs and outputs it to the controller 100.

The power supply current detector 52 is disposed between the AC power supply 1 and the PWM converter 23. The power supply current detector 52 includes, for example, a shunt resistor inserted in a line connecting the terminal 1b of the AC power supply 1 and the AC terminal 232. The power supply current detector 52 detects a power supply current Is flowing between the AC power supply 1 and the PWM converter 23 and outputs it to the controller 100.

The bus voltage detector 53 is connected between the two electrodes of the smoothing capacitor 25 and thus connected between the buses 12a and 12b. The bus voltage detector 53 detects the bus voltage Vdc and outputs it to the controller 100.

The bus current detector 54 includes a shunt resistor inserted in the DC bus 12b. The bus current detector 54 detects a bus current, i.e., an input current Idc to the inverter 40, and outputs it to the controller 100.

The controller 100 controls the DC power supply circuit 20, inverter 40, and connection switching device 60.

The controller 100 controls the DC power supply circuit 20 to change its output voltage.

The controller 100 also controls the inverter 40 to change the frequency and voltage value of its output voltage.

The controller 100 further controls the connection switching device 60 to cause it to select the connection of the motor 7.

The controller 100 is implemented by a microprocessor. The microprocessor may be a processor or processing device referred to as a central processing unit (CPU), a microcomputer, or digital signal processor (DSP).

Figure 8:
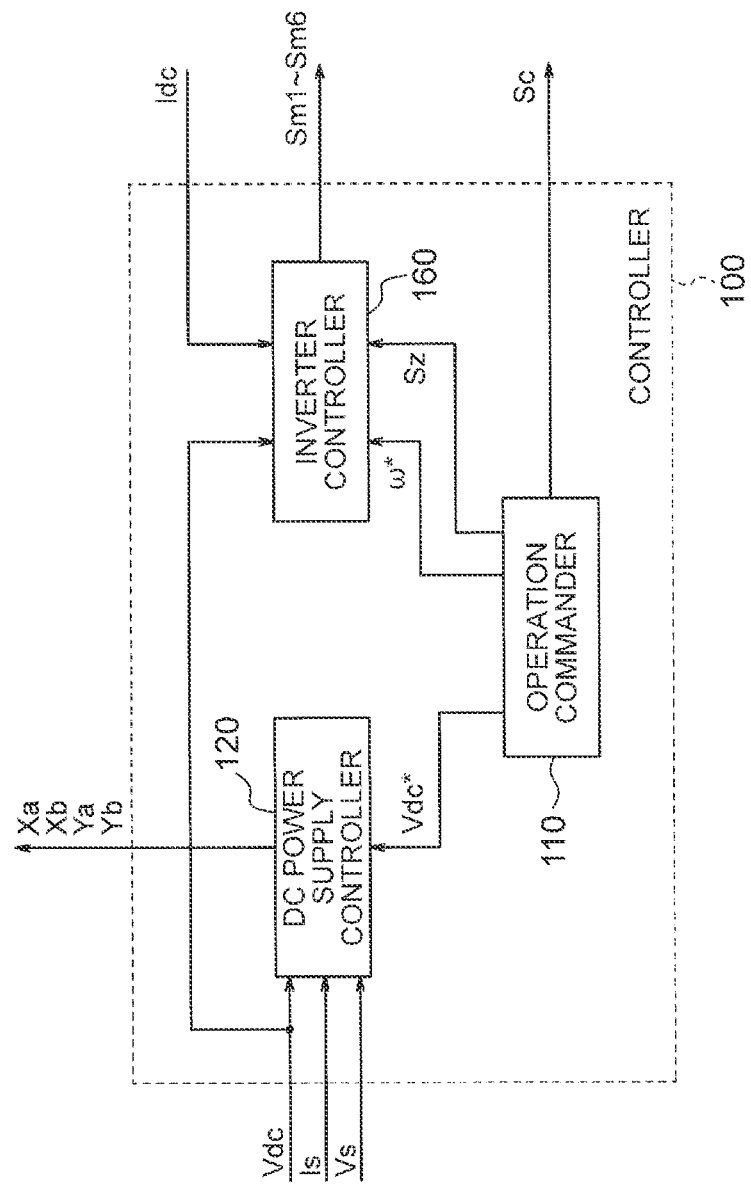
FIG. 8 is a diagram illustrating an example of a configuration of a controller used in the first embodiment.

The controller 100 includes, for example, an operation commander 110, a DC power supply controller 120, and an inverter controller 160, as illustrated in FIG. 8.

The operation commander 110 outputs a bus voltage command value Vdc*, a frequency command value ω*, a zero selection signal Sz, and the above-described connection selection signal Sc. The bus voltage command value Vdc* is supplied to the DC power supply controller 120, the frequency command value ω* and zero selection signal Sz are supplied to the inverter controller 160, and the connection selection signal Sc is supplied to the connection switching device 60.

The connection selection signal Sc is set to the first value, e.g., Low, when Y-connection is selected, and set to the second value, e.g., High, when Δ-connection is selected.

The zero selection signal Sz is normally set to a first value, e.g., Low, and set to a second value, e.g., High, during zero current control to be described later.

The operation commander 110 receives information indicating a room temperature (the temperature of a space to be air conditioned) detected by a temperature sensor (not illustrated), receives instructions from an operation unit (not illustrated), e.g., a remote controller, and controls operation of units of the air conditioner. The instructions from the operation unit include information indicating a set temperature, selection of the operation mode, a command to start the operation, a command to end the operation, and the like.

The operation commander 110 makes, for example, a determination as to whether the stator windings of the motor 7 are to be connected in Y-connection or Δ-connection, and a determination of a target rotational speed, and outputs the connection selection signal Sc and frequency command value ω* on the basis of the determinations.

For example, when a difference between the room temperature and the set temperature is great, the operation commander 110 determines to select Δ-connection, sets the connection selection signal Sc to the second value (High), sets the target rotational speed to a relatively high value, and outputs the frequency command value ω* such that it gradually increases to the frequency corresponding to the above target rotational speed after the starting. When the frequency corresponding to the target rotational speed is reached, the state is maintained until the room temperature approaches the set temperature. When the room temperature approaches the set temperature, the connection is switched to Y-connection (for this, the connection selection signal Sc being set to the first value (Low)). After that, control to maintain the state in which the room temperature is close to the set temperature is performed. This control includes adjustment of the frequency, stop of the motor, restarting of the motor, and the like.

When the operation commander 110 changes the value of the connection selection signal Sc to switch from one of Y-connection and Δ-connection to the other, it temporarily changes the frequency command value ω* and the value of the zero selection signal Sz during the switching operation.

For example, in the switching, the operation commander 110 temporarily sets the bus voltage command value Vdc* and frequency command value ω* to greater values. Then, during the period in which the bus voltage command value Vdc* and frequency command value ω* are set at the greater values, the zero selection signal Sz (which is normally Low) is temporarily set to High. Then, during the period in which the zero selection signal Sz is set at High, the connection selection signal Sc is switched from High to Low or from Low to High.

Such an operation will be described later in more detail with reference to FIGS. 15A to 15E.

The DC power supply controller 120 generates the PWM signals Xa, Xb, Ya, and Yb for driving the switching elements of the PWM converter 23 on the basis of the detection values Vs, Is, and Vdc of the power supply voltage detector 51, power supply current detector 52, and bus voltage detector 53.

The PWM signal Xa indicates the periods in which the switching element 332 is turned on, and may be referred to as a "first drive pulse."

The PWM signal Xb indicates the periods in which the switching element 331 is turned on, and may be referred to as a "second drive pulse."

The PWM signal Ya indicates the periods in which the switching element 333 is turned on, and the PWM signal Yb indicates the periods in which the switching element 334 is turned on. The PWM signals Ya and Yb may be referred to as "synchronization drive pulses."

The operation of the PWM converter 23 will be described below with reference to FIGS. 9A and 9B and FIGS. 10A and 10B.

Figure 9A:
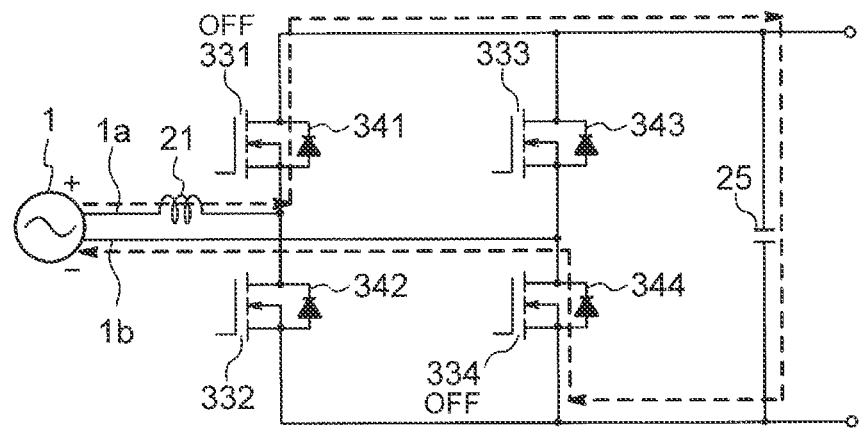
FIG. 9A is a diagram illustrating a charging path to a smoothing capacitor when a power supply voltage is positive in polarity.
Figure 9B:
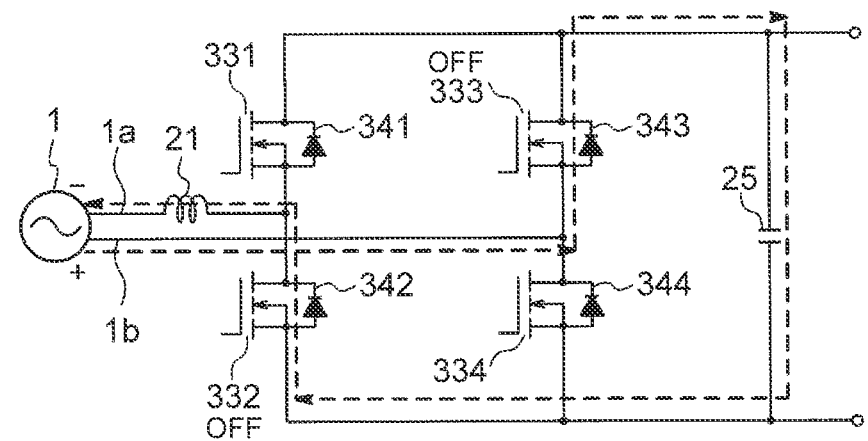
FIG. 9B is a diagram illustrating a charging path to the smoothing capacitor when the power supply voltage is negative in polarity.
Figure 10A:
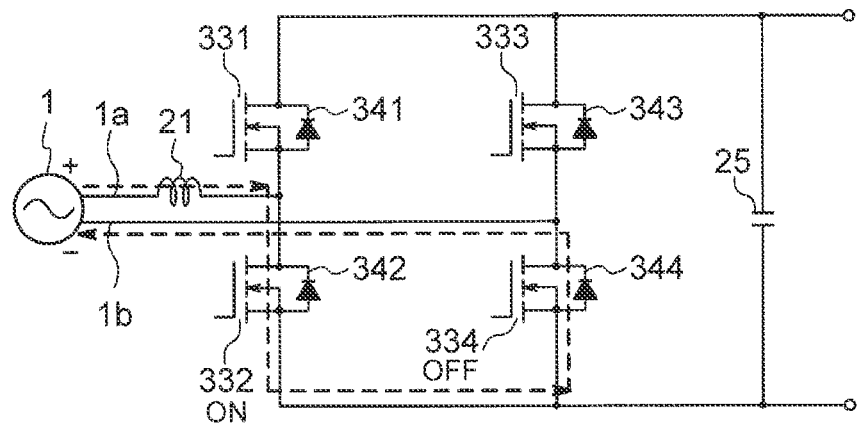
FIG. 10A is a diagram illustrating a short-circuit path of an AC power supply through a reactor when the power supply voltage is positive in polarity.
Figure 10B:
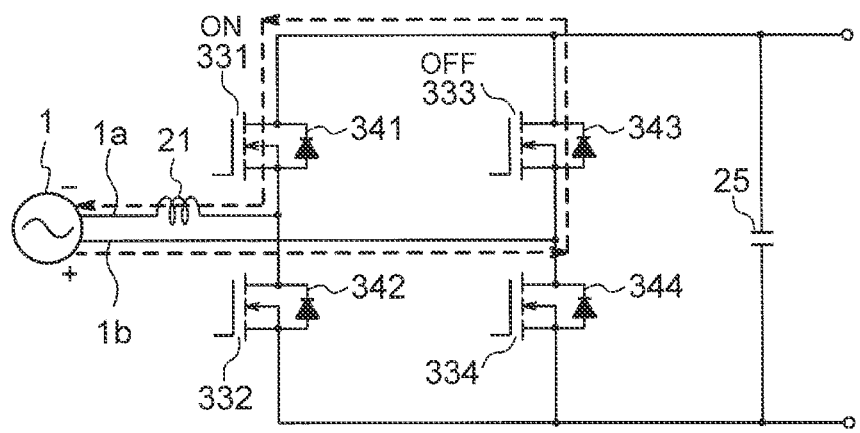
FIG. 10B is a diagram illustrating a short-circuit path of the AC power supply through the reactor when the power supply voltage is negative in polarity.

It is defined that when the first terminal 1a of the AC power supply 1 is positive in potential as illustrated in FIGS. 9A and 10A, the polarity of the power supply voltage Vs is positive, and when the first terminal 1a of the AC power supply 1 is negative in potential as illustrated in FIGS. 9B and 10B, the polarity of the power supply voltage Vs is negative.

FIGS. 9A and 9B illustrate current paths at the time of charging the smoothing capacitor 25. They differ in that FIG. 9A illustrates a charging path when the power supply voltage Vs is positive in polarity, and FIG. 9B illustrates a charging path when the power supply voltage Vs is negative in polarity.

FIGS. 10A and 10B illustrate cases of short-circuiting both ends of the AC power supply 1 through the reactor 21 without charging the smoothing capacitor 25, and thus illustrate short-circuit paths of the AC power supply 1 through the reactor 21.

They differs in that FIG. 10A illustrates a short-circuit path when the power supply voltage Vs is positive in polarity, and FIG. 10B illustrates a short-circuit path when the power supply voltage Vs is negative in polarity.

When the switching elements 331 to 334 are maintained in the off states, the PWM converter 23 operates as a full-wave rectifying circuit without a boosting function, and current for charging the smoothing capacitor 25 flows depending on the polarity of the power supply voltage, as illustrated in FIG. 9A or 9B. The operation mode at this time is referred to as a "normal mode."

On the other hand, as illustrated in FIG. 10A, when the switching element 332 is turned on while the power supply voltage Vs is positive in polarity, a short-circuit path can be formed by a path from the AC power supply 1 through the reactor 21, switching element 332, diode 344, and back to the AC power supply 1.

Also, as illustrated in FIG. 10B, when the switching element 331 is turned on while the power supply voltage Vs is negative in polarity, a short-circuit path can be formed by a path from the AC power supply 1 through the diode 343, switching element 331, reactor 21, and back to the AC power supply 1.

Forming the short-circuit paths including the reactor 21 in this manner is referred to as "power supply short-circuit," and the operation mode in which control for the power supply short-circuit is performed is referred to as a "power supply short-circuit mode."

The operation mode of the PWM converter 23 is switched by control by the DC power supply controller 120, and the bus voltage command value Vdc* is switched by the switching of the operation mode.

Figure 11:
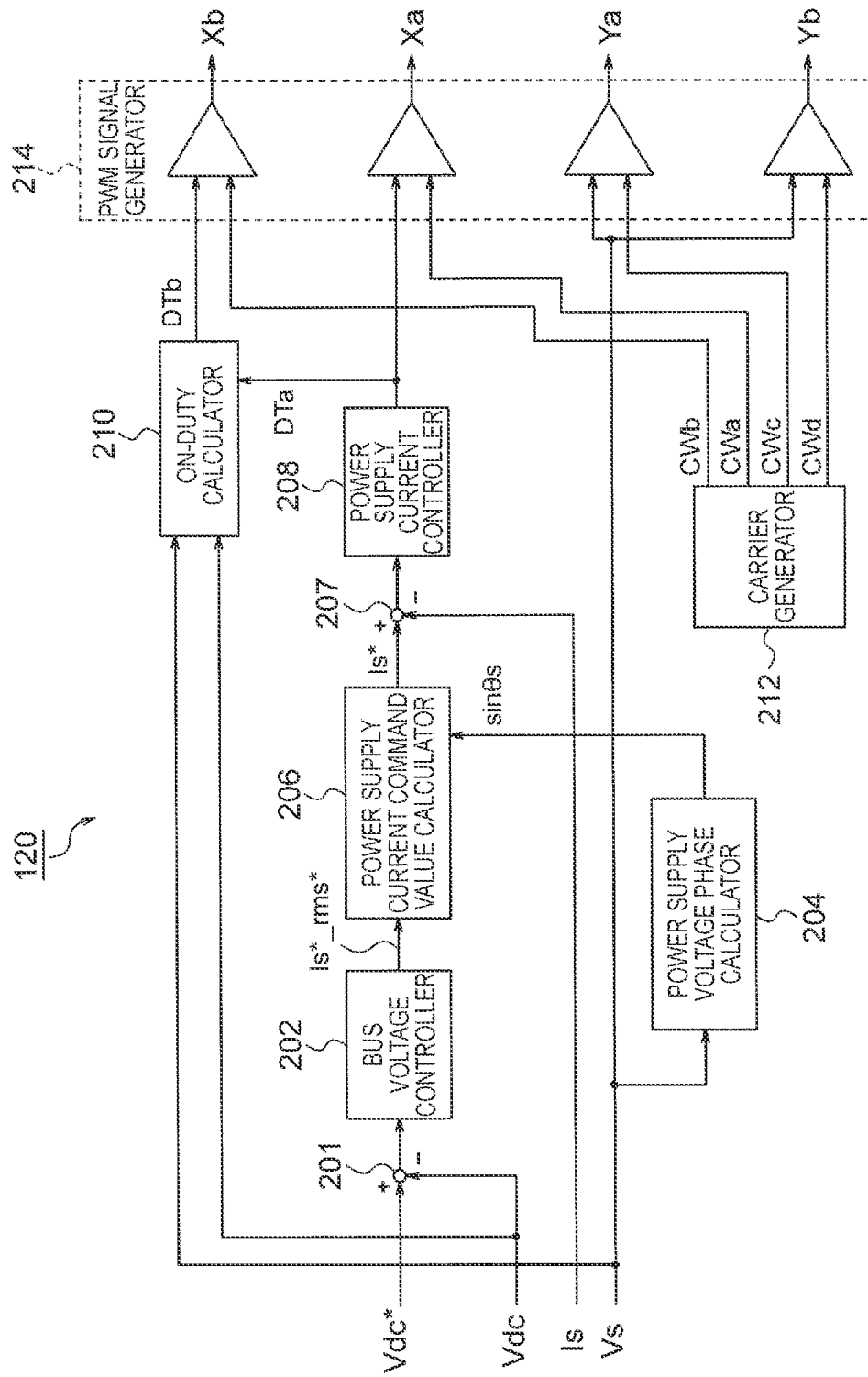
FIG. 11 is a functional block diagram illustrating an example of a DC power supply controller of the controller illustrated in FIG. 8.

FIG. 11 is a diagram illustrating an example of a configuration of the DC power supply controller 120 used in the motor driving apparatus 2 according to the first embodiment. As illustrated in FIG. 11, the DC power supply controller 120 includes a subtractor 201, a bus voltage controller 202, a power supply voltage phase calculator 204, a power supply current command value calculator 206, a subtractor 207, a power supply current controller 208, an on-duty calculator 210, a carrier generator 212, and a PWM signal generator 214.

The subtractor 201 determines a difference of the bus voltage Vdc detected by the bus voltage detector 53 relative to the bus voltage command value Vdc* supplied from the operation commander 110.

The bus voltage controller 202 performs proportional-integral calculation on the difference determined by the subtractor 201, thereby determining a power supply current effective value command value Is_rms* for reducing the difference.

In the above example, the bus voltage controller 202 performs proportional-integral calculation as calculation for determining the power supply current effective value command value Is_rms*. However, alternatively, the bus voltage controller 202 may perform proportional calculation or proportional-derivative-integral calculation.

The power supply voltage phase calculator 204 estimates the phase of the power supply voltage Vs on the basis of the power supply voltage Vs detected by the power supply voltage detector 51, and determines the sine value sin θs of the estimated value θs.

Figure 12:
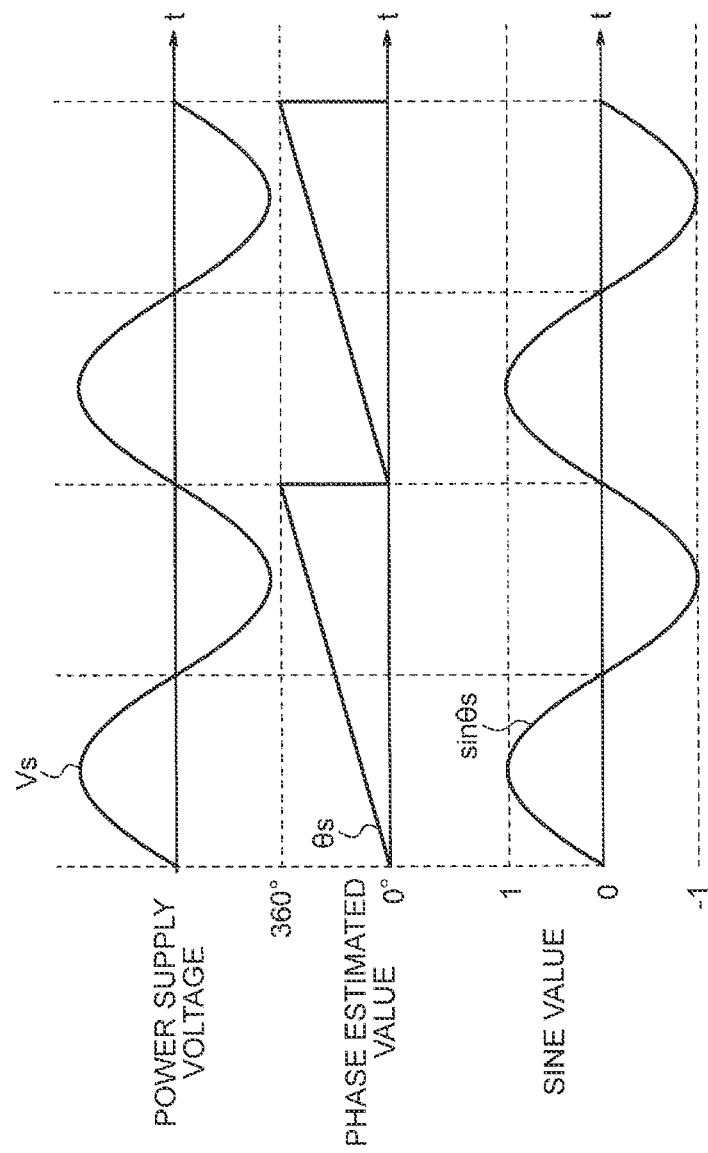
FIGS. 12A to 12C are diagrams illustrating an example of an operation of a power supply voltage phase calculator of the DC power supply controller illustrated in FIG. 11.

FIGS. 12A to 12C are diagrams illustrating an example of an operation of the power supply voltage phase calculator 204, t on the horizontal axis denoting time. FIG. 12A illustrates the waveform of the power supply voltage Vs, FIG. 12B illustrates the waveform of the power supply voltage phase estimated value θs, and FIG. 12C illustrates the waveform of the sine value sin θs of the phase estimated value θs. FIGS. 12A to 12C illustrate the waveforms on the assumption that there is no delay due to control or no delay due to detection.

As illustrated in FIGS. 12A and 12B, at the points where the power supply voltage Vs changes in polarity from negative to positive, the power supply voltage phase estimated value θs is 360°. The power supply voltage phase calculator 204 detects the times at which the power supply voltage Vs changes in polarity from negative to positive, and resets the power supply voltage phase estimated value θs, i.e., returns the power supply voltage phase estimated value θs to zero, at the change times.

When the controller 100 is formed by a microcomputer and an interrupt function of the microcomputer is used to reset the power supply voltage phase estimated value θs, a circuit for detecting zero crossings of the power supply voltage Vs may be added in the DC power supply controller 120 (FIG. 11). In any case, any method may be used as long as the phase of the power supply voltage Vs can be detected.

The power supply current command value calculator 206 calculates a power supply current instantaneous value command value Is*. The power supply current instantaneous value command value Is* can be determined from the power supply current effective value command value Is_rms* output by the bus voltage controller 202 and the sine value sin θs of the phase estimated value θs output by the power supply voltage phase calculator 204.

Specifically, Is* can be determined by $$Is^* = \sqrt{2} \times Is\_rms^* \times \sin θs. \qquad (3)$$

The subtractor 207 determines a difference of the power supply current Is relative to the power supply current instantaneous value command value Is*.

The power supply current controller 208 performs proportional-integral calculation on the difference determined by the subtractor 207, thereby determining an on-duty DTa for reducing the difference.

The on-duty DTa is referred to when the PWM signal Xa is generated.

As the calculation in the power supply current controller 208, proportional calculation or proportional-derivative-integral calculation may be performed instead of the proportional-integral calculation.

The on-duty calculator 210 calculates an on-duty DTb on the basis of the power supply voltage Vs, bus voltage Vdc, and on-duty DTa.

The on-duty DTb is referred to when the PWM signal Xb is generated.

The carrier generator 212 generates a first carrier wave CWa, a second carrier wave CWb, a third carrier wave CWc, and a fourth carrier wave CWd. These carrier waves CWa, CWb, CWc, and CWd are, for example, triangular waves.

The first carrier wave CWa and second carrier wave CWb have a phase difference of 180° therebetween. The third carrier wave CWc and fourth carrier wave CWd have a phase difference of 180° therebetween.

The PWM signal generator 214 generates the PWM signal Xa by comparing the on-duty DTa and the first carrier wave CWa.

The PWM signal generator 214 also generates the PWM signal Xb by comparing the on-duty DTb and the second carrier wave CWb.

The PWM signal generator 214 further generates the PWM signal Ya by comparing the power supply voltage Vs and the third carrier wave CWc.

The PWM signal generator 214 further generates the PWM signal Yb by comparing the power supply voltage Vs and the fourth carrier wave CWd.

The controller 100 not only performs control of the DC power supply circuit 20 as described above, but also performs control of the operation of the inverter 40 and control of switching of the connection by the connection switching device 60.

For control of the inverter 40, the inverter controller 160 of the controller 100 generates PWM signals Sm1 to Sm6 and supplies them to the inverter 40.

The inverter 40 includes the drive circuit 450 besides the inverter main circuit 410 as described above. The drive circuit 450 generates drive signals Sr1 to Sr6 on the basis of the PWM signals Sm1 to Sm6 and controls turning on and off of the switching elements 411 to 416 by using the drive signals Sr1 to Sr6, thereby applying the three-phase AC voltage of variable frequency and variable voltage value to the motor 7.

Figure 13:
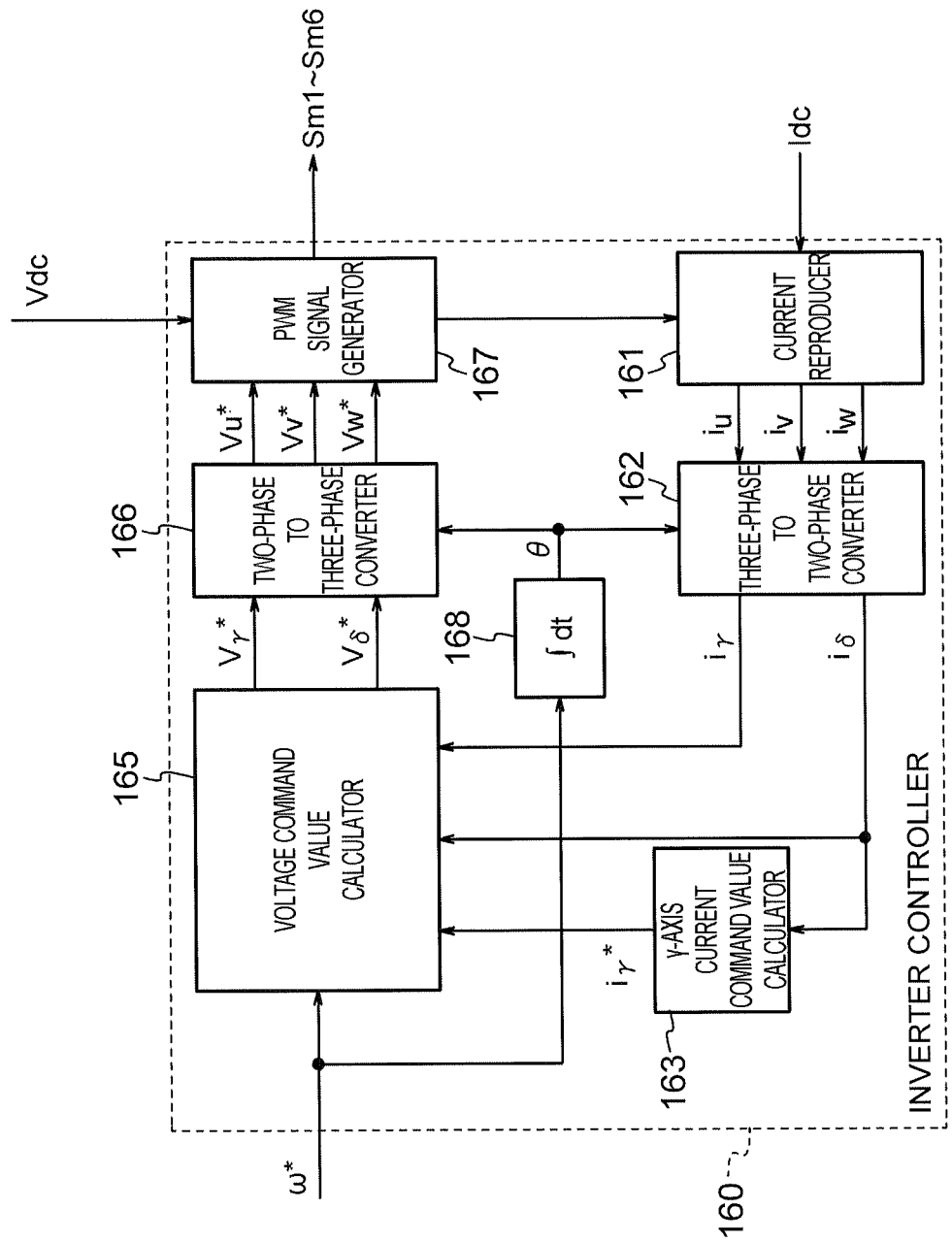
FIG. 13 is a functional block diagram illustrating an example of an inverter controller of the controller illustrated in FIG. 8.

The inverter controller 160 includes a current reproducer 161, a three-phase to two-phase converter 162, a γ-axis current command value calculator 163, a voltage command value calculator 165, a two-phase to three-phase converter 166, a PWM signal generator 167, and an electrical angle phase calculator 168, as illustrated in FIG. 13.

The current reproducer 161 reproduces phase currents $i_u$, $i_v$, and $i_w$ flowing through the motor 7 on the basis of the current value Idc detected by the bus current detector 54. The current reproducer 161 reproduces the phase currents by sampling the DC current Idc detected by the bus current detector 54 at times synchronized with AC voltages corresponding to the PWM signals from the PWM signal generator 167.

The three-phase to two-phase converter 162 converts the current values $i_u$, $i_v$, and $i_w$ reproduced by the current reproducer 161 to current values on γ-δ axes represented by a γ-axis current (excitation current component) $i_γ$ and a δ-axis current (torque current component) $i_δ$, by using an electrical angle phase θ generated by the electrical angle phase calculator 168 to be described later.

The γ-axis current command value calculator 163 determines, on the basis of the δ-axis current $i_δ$, a γ-axis current command value $i_γ^*$ optimum for driving of the motor 7 at which the efficiency is highest.

In FIG. 13, the γ-axis current command value $i_γ^*$ is determined on the basis of the δ-axis current $i_δ$. However, the same effect can be obtained by determining the γ-axis current command value $i_γ^*$ on the basis of the γ-axis current $i_γ$ and frequency command value ω*.

The γ-axis current command value calculator 163 outputs, on the basis of the δ-axis current $i_δ$ (or the γ-axis current $i_γ$ and frequency command value ω*), a γ-axis current command value $i_γ^*$ that provides a current phase angle βm (not illustrated) at which the output torque is not less than a predetermined value (or maximum), or the current value is not greater than a predetermined value (or minimum).

The voltage command value calculator 165 receives the γ-axis current $i_γ$ and δ-axis current $i_δ$ obtained by the three-phase to two-phase converter 162, the frequency command value ω* output from the operation commander 110, and the γ-axis current command value $i_γ^*$ obtained from the γ-axis current command value calculator 163, and outputs voltage command values $V_γ^*$ and $V_δ^*$.

Figure 14:
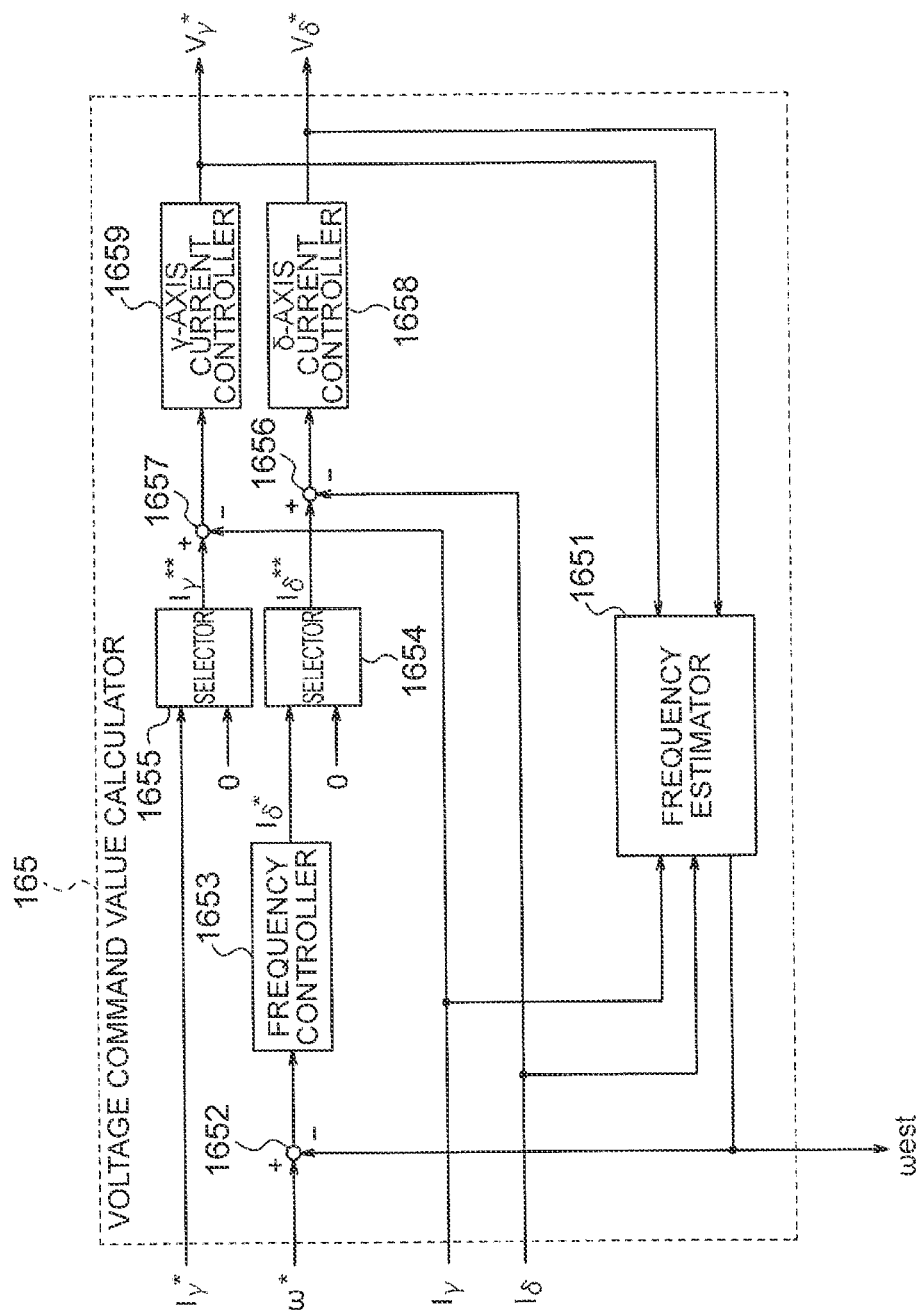
FIG. 14 is a functional block diagram illustrating an example of a configuration of a voltage command value calculator of the inverter controller illustrated in FIG. 13.

The voltage command value calculator 165 includes, for example, a frequency estimator 1651, a subtractor 1652, a frequency controller 1653, selectors 1654 and 1655, subtractors 1656 and 1657, a δ-axis current controller 1658, and a γ-axis current controller 1659, as illustrated in FIG. 14.

The frequency estimator 1651 estimates a frequency of the motor 7 on the basis of the γ-axis current $i_γ$ and δ-axis current $i_δ$ and the voltage command values $V_γ^*$ and $V_δ^*$, thereby generating a frequency estimated value ωest.

The subtractor 1652 determines a difference (ω*−ωest) of the frequency estimated value west generated by the frequency estimator 1651 relative to the frequency command value ω*.

The frequency controller 1653 performs proportional integral (PI) calculation on the difference determined by the subtractor 1652 and determines a δ-axis current command value $i_δ^*$ to reduce the difference. By generating the δ-axis current command value is* in this manner, control to make the frequency estimated value west coincide with the frequency command value ω* is performed.

The selector 1654 selects and outputs one of the δ-axis current command value $i_δ^*$ and a value 0 in accordance with the zero selection signal Sz. For example, when the zero selection signal Sz is the first value (e.g., Low), the selector 1654 selects $i_\delta^*$, and when the zero selection signal Sz is the second value (e.g., High), the selector 1654 selects 0. The output of the selector 1654 is referred to as a selected δ-axis current command value, and denoted by the symbol $i_\delta^{**}$.

The selector 1655 selects and outputs one of the γ-axis current command value $i_\gamma^*$ and a value 0 in accordance with the zero selection signal Sz. For example, when the zero selection signal Sz is the first value (e.g., Low), the selector 1655 selects $i_\gamma^*$, and when the zero selection signal Sz is the second value (e.g., High), the selector 1655 selects 0. The output of the selector 1655 is referred to as a selected γ-axis current command value, and denoted by the symbol $i_\gamma^{**}$.

The subtractor 1656 determines a difference $(i_\delta^{}-i_\delta)$ of is relative to the output (selected δ-axis current command value) $i_\delta^{}$ of the selector 1654.

The δ-axis current controller 1658 performs proportional integral (PI) calculation on the difference determined by the subtractor 1656, thereby generating the δ-axis voltage command value $V_\delta^*$ to reduce the difference. By generating the δ-axis voltage command value $V_\delta^*$ in this manner, control to make $i_\delta$ coincide with $i_\delta^{**}$ is performed.

Specifically, when $i\delta^*$ is selected as $i\delta^{**}$, control to make $i_\delta$ coincide with $i_\delta^*$ is performed, and when 0 is selected as $i_\delta^{**}$, control to make $i_\delta$ coincide with 0 is performed.

The subtractor 1657 determines a difference $(i_\gamma^{}-i_\gamma)$ of $i_\gamma$ relative to the output (selected γ-axis current command value) $i_\gamma^{}$ of the selector 1655.

The γ-axis current controller 1659 performs proportional integral (PI) calculation on the difference determined by the subtractor 1657, thereby generating the γ-axis voltage command value $V_\gamma^*$ to reduce the difference. By generating the γ-axis voltage command value $V_\gamma^*$ in this manner, control to make $i_\gamma$ coincide with $i_\gamma^{**}$ is performed.

Specifically, when $i_\gamma^*$ is selected as $i_\gamma^{**}$, control to make $i_\gamma$ coincide with $i_\gamma^*$ is performed, and when 0 is selected as $i_\gamma^{**}$, control to make $i_\gamma$ coincide with 0 is performed.

Control to make the δ-axis current $i_\delta$ and γ-axis current $i_\gamma$ coincide with 0 is referred to below as "zero current control."

The two-phase to three-phase converter 166 converts the γ-axis voltage command value $V_\gamma^*$ and δ-axis voltage command value $V_\delta^*$ (voltage command values in a two-phase coordinate system) obtained by the voltage command value calculator 165 to output voltage command values (three-phase voltage command values) Vu*, Vv*, and Vw* in a three-phase coordinate system, by using the electrical angle phase 0 obtained by the electrical angle phase calculator 168, and outputs them.

The PWM signal generator 167 generates and outputs the PWM signals Sm1 to Sm6 on the basis of the bus voltage Vdc detected by the bus voltage detector 53 and the three-phase voltage command values Vu*, Vv*, and Vw* output from the two-phase to three-phase converter 166.

The drive circuit 450 generates the drive signals Sr1 to Sr6 on the basis of the PWM signals Sm1 to Sm6.

The following describes an operation of the motor driving apparatus 2 at the time of operating the connection switching device 60 while the motor is being operated.

First, a problem of prior art, or an operation of a motor driving apparatus without features of the present embodiment will be described with reference to FIG. 2.

While the motor is being operated, i.e., while current is flowing through the switches 61, 62, and 63 constituting the connection switching device 60, when the currents flowing through the exciting coils 611, 621, and 631 (FIG. 6) are operated (turned from off to on or from on to off), the connections of the common contacts 61c, 62c, and 63c are switched to the normally closed contacts 61b, 62b, and 63b or normally open contacts 61a, 62a, and 63a. If power continues to be supplied from the inverter 40 to the motor 7 at the time of the switching, arcing may occur between the contacts of the switches 61 to 63, thereby causing failures, such as contact welding.

To avoid such failures, it is conceivable to stop the power supply from the inverter 40 to the motor 7 and make the rotational speed Nm of the motor 7 zero prior to operating the connection switching device 60. This makes it possible to perform the switching without causing arcing between the contacts of the switches 61 to 63.

However, making the rotational speed Nm of the motor 7 zero increases the torque required for the restart, which may increase the current during the start or prevent the restart.

For example, in a case where the motor 7 drives the compressor 904, immediately after the rotational speed Nm is made zero, the state of the refrigerant is unstable, and thus the torque required for the restart is increased.

It is conceivable to perform the restart after a time required for the state of the refrigerant to become sufficiently stable elapses after the rotational speed Nm of the motor 7 is made zero. In this case, it becomes impossible to compress the refrigerant with the compressor 904, and the room temperature may greatly deviate from the desired temperature due to reduction in the cooling capacity or heating capacity.

By causing the connection switching device 60 to perform the switching operation while controlling the current flowing through the connection switching device 60 to be zero, it is possible to prevent arcing from occurring between the contacts of the switches 61 to 63 during the switching.

This eliminates the need to make the rotational speed Nm of the motor 7 zero for the switching.

The current flowing through the connection switching device 60 can be made zero by making the current flowing through the motor 7 zero.

The current flowing through the motor 7 can be made zero by selecting the values 0 instead of $i_\delta^*$ and $i_\gamma^*$ in the selectors 1654 and 1655 illustrated in FIG. 14 and supplying them as the selected command values $i_\delta^{}$ and $i_\gamma^{}$ to the current controllers 1658 and 1659.

Thereby, the current controller 1658 performs control to make $i_\delta$ coincide with 0, and the current controller 1659 performs control to make $i_\gamma$ coincide with 0.

In performing the above-described zero current control, the following points should be noted.

In switching the connection, it is necessary to continue the zero current control for a certain amount of time. During the zero current control, the output torque is zero, and the rotational speed is decreased by the load torque.

The longer the period of the zero current control and the greater the load torque, the greater the decrease in the speed.

When the zero current control is started at low speed, it is possible that the rotational speed decreases to near zero, causing step-out.

It is conceivable to prevent the rotational speed from decreasing to near zero by increasing the rotational speed of the motor and performing the zero current control in this state.

However, as the speed increases, the back electromotive force of the motor increases, and it is necessary to output, from the inverter 40, a voltage not less than the back electromotive force. When a modulation factor of the inverter 40 exceeds 1, the output voltage enters a region in which it is saturated, as illustrated in FIG. 16. This region is referred to as a voltage saturation region or an overmodulation region.

In the region in which the output voltage is saturated, it is necessary to perform flux weakening control that passes a negative d-axis current to reduce the induced voltage in appearance. However, when the zero current control is performed in the voltage saturation region, it becomes impossible to pass the negative d-axis current, and it is possible that the back electromotive force of the motor exceeds the maximum output voltage of the inverter, causing step-out.

Thus, the present embodiment increases the bus voltage with the DC power supply circuit 20, thereby placing the inverter in a state in which it can output a higher voltage, performs the zero current control in this state, switches the connection, and upon completion of the switching, restores the bus voltage. This allows the switching in a high-speed region.

FIGS. 15A to 15E illustrate an example of a control sequence in performing the connection switching. FIGS. 15A to 15E assume a switching from Y-connection to Δ-connection.

FIG. 15A illustrates the current flowing through the connection switching device 60. FIG. 15B illustrates the zero selection signal Sz. FIG. 15C illustrates the connection selection signal Sc. FIG. 15D illustrates the bus voltage command value Vdc*. FIG. 15E illustrates the frequency command value ω*.

As illustrated in FIGS. 15A to 15E, the bus voltage command value Vdc* and frequency command value ω* are temporarily increased prior to switching the connection, the zero current control is performed with them increased, and the connection is switched while the zero current control is performed.

A more detailed description will be given below.

It is assumed that before starting the switching process, the motor 7 is being driven in a state in which the bus voltage command value Vdc* is a certain value (first voltage value) Vdc*(0) and the frequency command value ω* is a certain value (first frequency value) ω*(0).

After starting the switching process, from time ta1 to time ta2, the bus voltage command value Vdc* is increased to a value (second voltage value) Vdc*(1) greater than the above first voltage value Vdc*(0) (FIG. 15D), and thereby the DC power supply circuit 20 is caused to increase the bus voltage Vdc.

After the increase is completed at time ta2, from time tb1 to time tb2, the frequency command value is increased to a value (second frequency value) ω*(1) greater than the above first frequency value ω*(0) (FIG. 15E), and thereby the frequency ω is increased.

After that, during the period from time tc to time te, the value of the zero selection signal Sz is set to High (FIG. 15B), so that the values 0 are selected as the current command values and the zero current control is performed (FIG. 15A); during the zero current control, at time td, the value of the connection selection signal Sc is changed from Low to High (FIG. 15C), so that the connection switching device 60 is switched.

Upon completion of the switching of the connection switching device 60, from time tf1 to time tf2, the frequency command value ω* is returned to the original value (first frequency value) ω*(0) (FIG. 15E). When the rotational speed is decreased, from time tg1 to time tg2, the bus voltage command value Vdc* is returned to the original value (first voltage value) Vdc*(0) (FIG. 15D).

While the above assumes that there is no delay of the bus voltage Vdc relative to the bus voltage command value Vdc* and there is no delay of the frequency ω relative to the frequency command value ω*, when such delays exist, the switching of the connection switching device 60 may be performed while the bus voltage Vd and frequency ω are greater values.

While FIGS. 15A to 15E assume the switching from Y-connection to Δ-connection, the switching from Δ-connection to Y-connection can be performed in the same manner. However, in the case of the switching from Δ-connection to Y-connection, the connection selection signal Sc of FIG. 15C switches from High to Low, instead of from Low to High.

Sequences other than the above sequence are possible. However, to perform the zero current control at high speed, it is necessary to drive the motor outside the voltage saturation region by increasing the bus voltage while increasing the rotational speed.

The following describes the set value of the bus voltage command value Vdc* to the DC power supply circuit 20 at the time of the above zero current control.

Voltage equations on dq coordinate axes of a permanent magnet synchronous motor are as shown in the following equations (4) and (5):

$$Vd=(Ra+p \cdot Ld)id-\omega \cdot Lq \cdot iq \tag{4}$$

$$Vq=(Ra+p \cdot Lg)iq+\omega \cdot Ld \cdot id+\omega \cdot \Phi a. \tag{5}$$

In equations (4) and (5),
Vd and Vq denote d- and q-axis components of an armature voltage,
id and iq denote d- and q-axis components of an armature current,
Ld and Lq denote d- and q-axis inductances,
Ra denotes an armature wiring resistance,
Φa denotes an armature interlinkage flux of a permanent magnet, and
p denotes a differential operator.

When it is assumed that in the above equations (4) and (5), id=iq=0 due to the above zero current control and p·id=p·iq=0 due to continuation of the zero current control, $$Vq=\omega \cdot \Phi a \tag{6}$$

is obtained. Thus, in performing the zero current control, when the rotational speed at the time of the switching is ω, the bus voltage Vdc needs to be boosted as shown in equation (7):

$$Vdc \geq \sqrt{2} \cdot \omega \cdot \Phi a. \tag{7}$$

While the value of the armature interlinkage flux Φa depends on the connection, it is necessary to use the greater of the value before the connection switching and the value after the connection switching. For example, since the value of Φa in the case of Y-connection is √3 times that of Φa in the case of Δ-connection, when switching is made from one of Δ-connection and Y-connection to the other, the value of Φa in the case of Y-connection is used.

This is because, for example, when switching is made from Δ-connection to Y-connection, if the bus voltage is set according to equation (7) by using, as Φa, the value in the case of Δ-connection, it is possible that immediately after the switching to Y-connection, the voltage saturation region is entered, and the zero current control cannot be performed.

The above operation allows current control that makes the current flowing through the motor 7, or the switches 61, 62, and 63, zero as illustrated in FIG. 15A. Thus, it becomes possible to perform the switching while no current flows through the switches 61, 62, and 63, and arcing is prevented from occurring between the contacts during the switching. Thus, it is possible to prevent contact welding when a mechanical relay is used, and provide a reliable motor driving apparatus.

Moreover, since there is no great change in current during the switching, it is possible to prevent the rotational speed of the motor 7 from changing suddenly due to the switching, and it is possible to switch the connection while preventing noise and vibration.

Thus, it is possible to provide a reliable motor driving apparatus.

Furthermore, since the preparatory loads required in Patent Literature 1 are not required, even under the condition in which a large current flows, it is possible to prevent increase in apparatus size.

Although the above embodiment makes the current flowing through the motor 7 and connection switching device 60 zero, it need not necessarily be zero, and it is sufficient that it be not greater than a predetermined threshold. The threshold may be set at a maximum value of a range in which no arcing occurs in the switches 61, 62, and 63 of the connection switching device 60 during the connection switching or a range in which no problem occurs even when arcing occurs, or at a value smaller by a slight margin than the maximum value.

In short, the switching of the connection by the motor driving apparatus may be performed as follows.

A transition may be made from a first state in which a first connection is selected by the connection switching device 60, the output voltage of the DC power supply circuit 20 is at a first voltage value, and the rotational speed of the motor 7 is at a first speed value, to a second state in which the output voltage of the DC power supply circuit 20 is higher than the first voltage value, the rotational speed of the motor 7 is higher than the first speed value, and the current flowing through the motor 7 is not greater than a predetermined threshold, and in the second state, the connection switching device 60 may perform switching from a state in which the first connection is selected to a state in which a second connection is selected.

The above state in which the current through the motor 7 is not greater than the predetermined threshold is, for example, a state in which the current through the motor 7 is made zero.

The above "higher output voltage" preferably has a value corresponding to the rotational speed of the motor 7. Specifically, it is preferable to perform the switching in a state in which the output voltage of the DC power supply circuit 20 is set at a value corresponding to the rotational speed of the motor 7 during the switching.

When the motor 7 is a permanent magnet motor, the above "higher output voltage" preferably satisfies the above equation (7). Thus, it is preferable to perform the switching in a state in which the output voltage of the DC power supply circuit 20 is set at a value satisfying the above equation (7).

The above description assumes that the PWM converter 23 of the DC power supply circuit 20 has a function of rectifying the AC voltage and a function of boosting the AC voltage, and these functions are always active. However, the boosting function may be normally inactive and be made active when the switching of the connection switching device 60 is performed. In this case, for example, it is possible to use the value of the voltage output from the DC power supply circuit 20 in a state in which the boosting function is inactive, as the above first voltage value of the output voltage of the DC power supply circuit 20, and use the value of the voltage output from the DC power supply circuit 20 in a state in which the boosting function is active, as the above "higher output voltage" of the output voltage of the DC power supply circuit 20.

Thereby, since the switching elements 331 to 334 of the PWM converter 23 are normally inactive, it is possible to eliminate loss due to switching of the switching elements 331 to 334.

It is preferable, after the switching, to return the output voltage of the DC power supply circuit 20 to the first voltage value and return the rotational speed of the motor 7 to the first speed value.

The above example is configured to reproduce the phase currents $i_u$, $i_v$, and $i_w$ from the DC current Idc on the input side of the inverter 40. However, it is also possible to provide current detectors in the output lines 431, 432, and 433 of the inverter 40 and detect the phase currents with the detectors. In this case, the currents detected by the detectors can be used instead of the currents reproduced by the current reproducer 161.

The material forming the switching elements 331 to 334 of the PWM converter 23 and the switching elements 411 to 416 of the inverter main circuit 410 is not limited to silicon (Si), and by forming them with material using wide-bandgap semiconductor, such as silicon carbide (SiC), gallium nitride (GaN), or diamond, it is possible to reduce loss.

Also, the switching elements 331 to 334 and switching elements 411 to 416 may be formed by insulated gate bipolar transistors (IGBTs), instead of MOSFETs.

The material forming the switching elements 331 to 334 and the switching elements 411 to 416 is not limited to silicon (Si), and by forming them with material using wide-bandgap semiconductor, such as silicon carbide (SiC), gallium nitride (GaN), or diamond, it is possible to reduce loss.

Second Embodiment

Although the first embodiment uses the DC power supply circuit 20 including the PWM converter 23 having the rectifying function and boosting function, it is also possible to use, as the DC power supply circuit, one having a configuration in which a circuit for rectification and a circuit for boost are separately formed.

Figure 17:
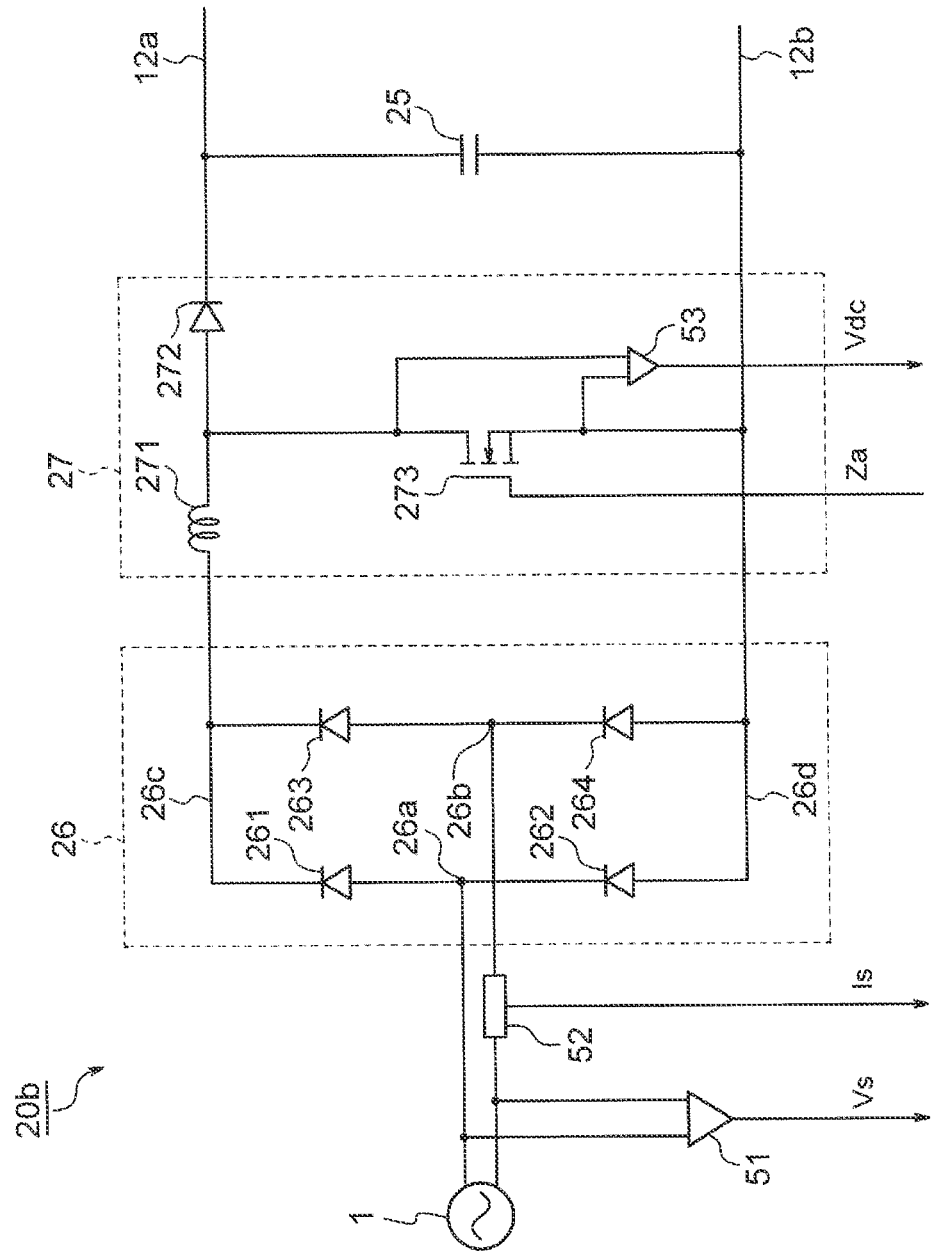
FIG. 17 is a wiring diagram illustrating an example of a configuration of a DC power supply circuit used in a second embodiment of the present invention.

FIG. 17 illustrates an example of such a DC power supply circuit 20*b*.

The illustrated DC power supply circuit 20*b* includes a rectifying circuit 26, a boost chopper circuit 27, and a capacitor 25.

The rectifying circuit 26 is a full-wave rectifying circuit with diodes 261, 262, 263, and 264 connected in a bridge.

AC terminals 26*a* and 26*b* of the rectifying circuit 26 are connected to the AC power supply 1.

The boost chopper circuit 27 includes a reactor 271, a diode 272, and a switching element 273.

One end of the reactor 271 is connected to a positive DC terminal 26*c* of the rectifying circuit 26. An anode of the diode 272 is connected to the other end of the reactor 271, and a cathode of the diode 272 is connected to a positive electrode of a capacitor 25 and thus to the positive DC bus 12*a*.

The switching element 273 is formed by, for example, a MOSFET.

The switching element 273 has its positive main terminal (drain) connected to a second end of the reactor 271 and its negative main terminal (source) connected to a negative DC terminal 26d of the rectifying circuit 26.

The negative DC terminal 26d of the rectifying circuit 26 is connected to a negative electrode of the capacitor 25 and thus to the negative DC bus 12b.

A control terminal (gate) of the switching element 273 is supplied with a PWM signal Za, and the switching element 273 is PWM controlled by the PWM signal Za.

Figure 18:
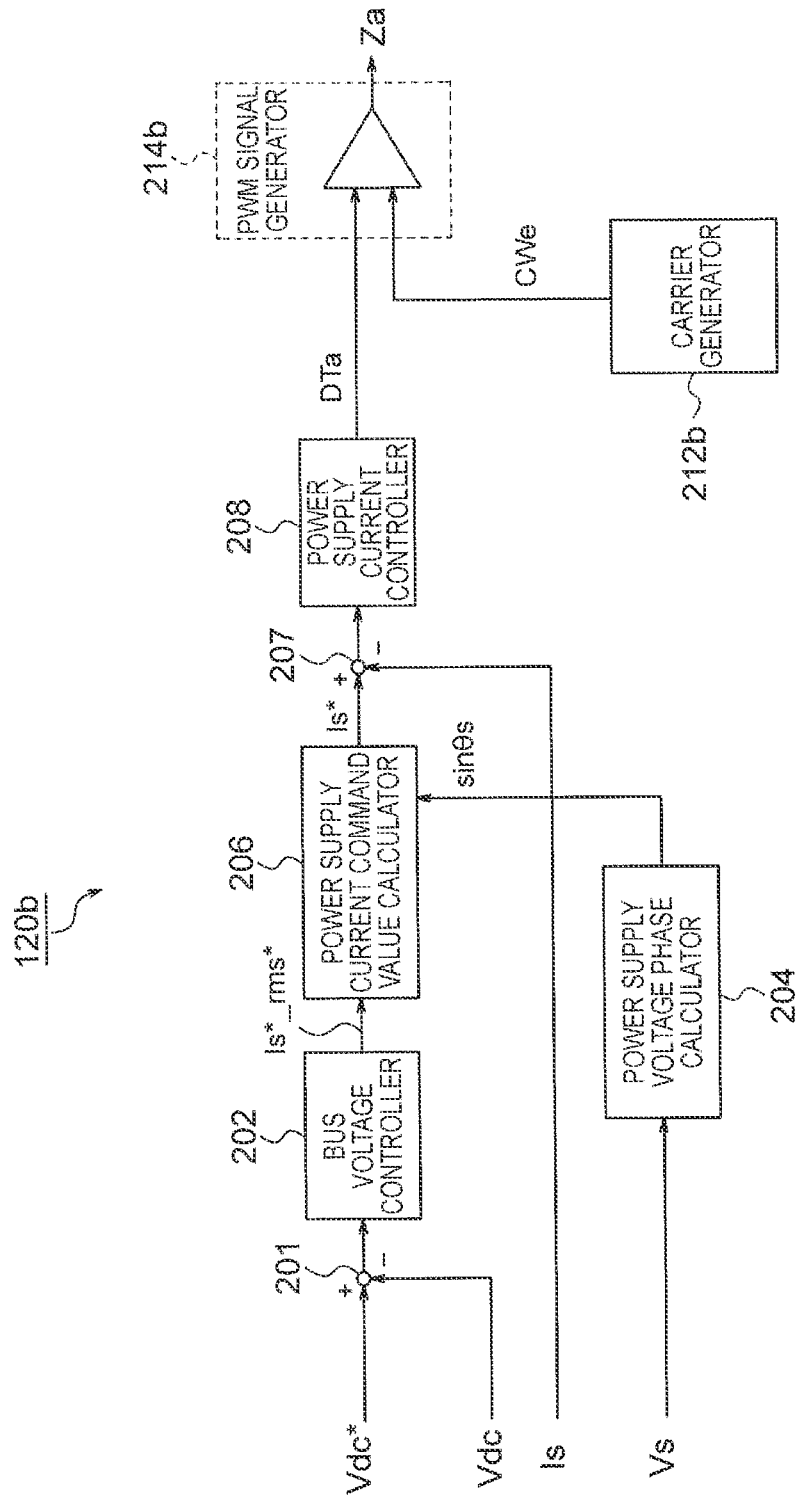
FIG. 18 is a functional block diagram illustrating an example of a DC power supply controller of a controller used in the second embodiment.

FIG. 18 illustrates an example of a configuration of a DC power supply controller 120b that generates the PWM signal supplied to the switching element 273 of the boost chopper circuit 27 of FIG. 17.

In FIG. 18, the reference characters that are the same as in FIG. 11 indicate the same or similar elements.

That is, the subtractor 201, bus voltage controller 202, power supply current command value calculator 206, subtractor 207, power supply current controller 208, and power supply voltage phase calculator 204 of FIG. 18 are the same as or similar to the elements of FIG. 11 having the same reference characters.

A carrier generator 212b of FIG. 18 generates a single carrier wave CWe.

The carrier wave CWe is a triangular wave.

A PWM signal generator 214b of FIG. 18 generates the PWM signal Za by comparing the on-duty DTa generated by the power supply current controller 208 and the carrier wave CWe.

The greater the on duty of the PWM signal Za, the higher the output voltage of the boost chopper circuit 27.

Instead of directly using the PWM signal Za to control the switching element 273, it is possible to generate a drive signal corresponding to the PWM signal Za with a drive circuit (not illustrated) and control the switching element 273 with the drive signal.

As described in the first embodiment, the boosting function of the boost chopper circuit 27 may be always active, or may be normally inactive and be made active when the switching of the connection switching device 60 is performed. In this case, for example, it is possible to use the value of the voltage output from the DC power supply circuit 20b in a state in which the boosting function is inactive, as the above first voltage value of the output voltage of the DC power supply circuit 20b, and use the value of the voltage output from the DC power supply circuit 20b in a state in which the boosting function is active, as the above "higher output voltage" of the output voltage of the DC power supply circuit 20b.

Thereby, since the switching element 273 of the boost chopper circuit 27 is normally inactive, it is possible to eliminate loss due to switching of the switching element 273.

Third Embodiment

Figure 19:
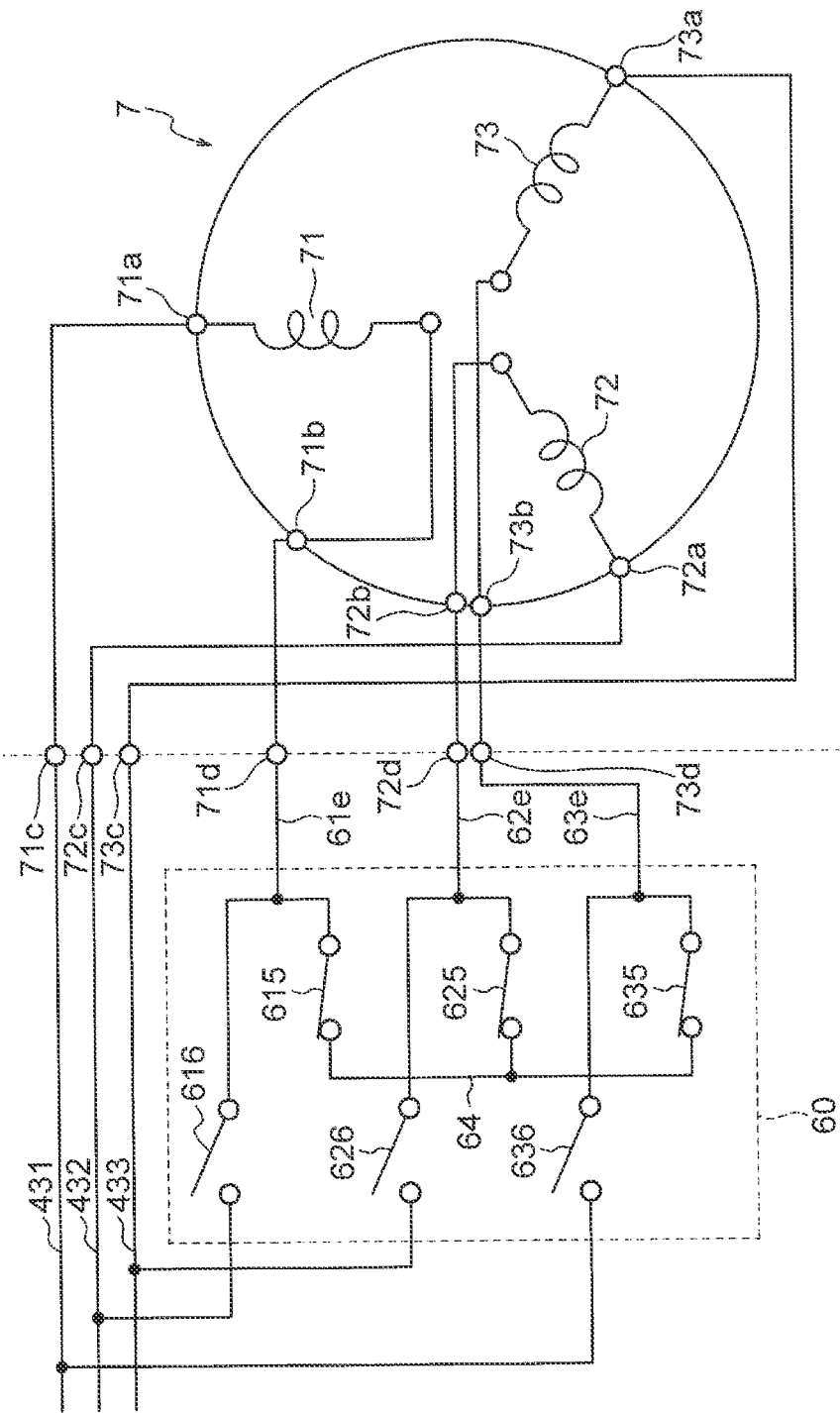
FIG. 19 is a wiring diagram illustrating windings of a motor and a connection switching device in a third embodiment of the present invention.

The configuration of FIG. 5 uses a selector switch as each of the switches (61, 62, and 63) of the connection switching device 60. Instead, each switch may be constituted by the combination of a normally closed switch and a normally open switch. FIG. 19 illustrates an example of a configuration of a connection switching device in this case.

In the configuration of FIG. 19, the combination of a normally closed switch 615 and a normally open switch 616 is used instead of the selector switch as the switch 61, the combination of a normally closed switch 625 and a normally open switch 626 is used instead of the selector switch as the switch 62, and the combination of a normally closed switch 635 and a normally open switch 636 is used instead of the selector switch as the switch 63.

As illustrated, when the normally closed switches 615, 625, and 635 are closed (on) and the normally open switches 616, 626, and 636 are open (off), the motor is in Y-connection, and contrary to the illustration, when the normally closed switches 615, 625, and 635 are open and the normally open switches 616, 626, and 636 are closed, the motor is in Δ-connection.

Even when each switch is constituted by the combination of a normally closed switch and a normally open switch as illustrated in FIG. 19, an electromagnetic contactor can be used as each switch. The electromagnetic contactor is preferable since it has low conduction loss when it is on.

When each switch is constituted by a combination of a normally closed switch and a normally open switch as illustrated in FIG. 19, it is possible to use, as each switch, a semiconductor switch formed by wide-bandgap semiconductor (WBG semiconductor) made of silicon carbide (SiC), gallium nitride (GaN), gallium oxide ($Ga_2O_3$), diamond, or the like. These have low on-resistance, low loss, and low heat generation. Also, these can be quickly switched.

Also in the case of using semiconductor switches as described above, it is possible to cause the switching operation to be performed quickly. However, the semiconductor devices have an operation variation of about a few microseconds. Thus, when a time constant L/R based on a winding resistance R and a winding inductance L of the motor 7 is very small, a sudden current change may occur, which not only may cause a sudden change in the rotational speed of the motor 7 and cause noise or vibration, but also may cause the semiconductor devices to generate heat and cause thermal destruction of the semiconductor devices.

Thus, in the connection switching device 60 formed by semiconductor devices, employing the zero current control makes it possible to perform the switching without a large current change. This not only makes it possible to prevent the rotational speed of the motor 7 from suddenly changing due to the switching and switch the connection while preventing noise and vibration, but also provides an advantage that it is possible to prevent the semiconductor devices from generating heat and thereby prevent destruction of the semiconductor devices.

Fourth Embodiment

The first to third embodiments assume that the motor can have the connection of the stator windings switched to Y-connection or Δ-connection.

The motor may be such that the connection is switched in another manner.

For example, the motor may be one that uses, as the winding of each phase, a winding constituted by two or more winding portions, and that can be switched to one of parallel connection and series connection.

In this case, both ends of each of the two or more winding portions constituting the winding of each phase are configured to be connectable to the outside of the motor 7, and the connection is switched by a connection switching device 60.

Figure 20:
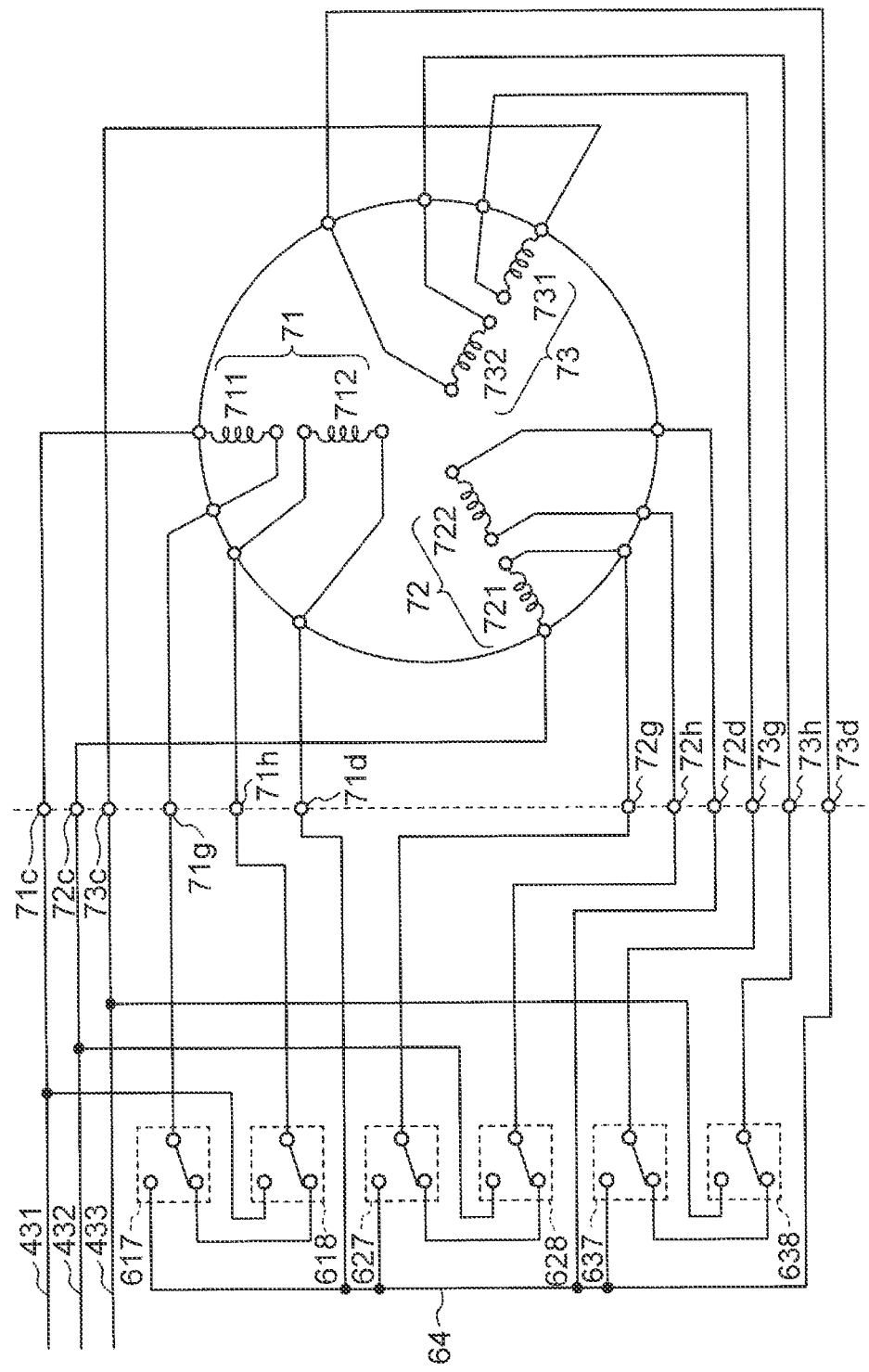
FIG. 20 is a wiring diagram illustrating windings of a motor and a connection switching device in a fourth embodiment of the present invention.

FIG. 20 illustrates a configuration in which the winding of each phase of a motor in Y-connection is constituted by two winding portions, both ends of each of the winding portions are connectable to the outside of the motor 7, and the connection is switched by the connection switching device 60.

Specifically, a U-phase winding 71 is constituted by two winding portions 711 and 712, a V-phase winding 72 is constituted by two winding portions 721 and 722, and a W-phase winding 73 is constituted by two winding portions 731 and 732.

First ends of the winding portions 711, 721, and 731 are connected to the output lines 431, 432, and 433 of the inverter 40 through external terminals 71c, 72c, and 73c.

Second ends of the winding portions 711, 721, and 731 are connected to common contacts of selector switches 617, 627, and 637 through external terminals 71g, 72g, and 73g.

First ends of the winding portions 712, 722, and 732 are connected to common contacts of selector switches 618, 628, and 638 through external terminals 71h, 72h, and 73h.

Second ends of the winding portions 712, 722, and 732 are connected to a neutral node 64 through external terminals 71d, 72d, and 73d.

Normally closed contacts of the selector switches 617, 627, and 637 are connected to normally closed contacts of the selector switches 618, 628, and 638.

Normally open contacts of the selector switches 617, 627, and 637 are connected to the neutral node 64.

Normally open contacts of the selector switches 618, 628, and 638 are connected to the output lines 431, 432, and 433 of the inverter 40.

The selector switches 617, 627, 637, 618, 628, and 638 constitute the connection switching device 60.

Even when such a connection switching device is used, the connection switching device 60 can be protected as described in the first to third embodiments.

In the case of the configuration illustrated in FIG. 20, when the selector switches 617, 627, 637, 618, 628, and 638 are switched to the normally closed contact sides as illustrated, the motor is in a state of series connection, and when the selector switches 617, 627, 637, 618, 628, and 638 are switched to the normally open contact sides contrary to the illustration, the motor is in a state of parallel connection.

Also in the fourth embodiment, it is possible to use the combination of a normally closed switch and a normally open switch instead of each selector switch, as described in the third embodiment.

Although the above describes a case in which the motor is in Y-connection and switched between series connection and parallel connection, the motor may be in Δ-connection and switched between series connection and parallel connection.

Although the above describes a configuration in which the windings of the respective phases in Y-connection or Δ-connection are switched to series connection or parallel connection, a configuration is also possible in which an intermediate tap is provided in the windings in Y-connection or Δ-connection and a voltage required for driving is changed by short-circuiting a part of the windings by switching means.

In short, it is sufficient that the motor be one in which the connection of the windings can be switched.

The configurations described in the above embodiments are examples of configurations of the present invention, and may be combined with other known techniques, and may be modified, e.g., by partial omission, without departing from the gist of the present invention.

INDUSTRIAL APPLICABILITY

As above, the present invention is suitable for a motor driving apparatus that switches and uses windings of a motor, and refrigeration cycle equipment provided therewith.

Although an air conditioner has been taken as an example of the refrigeration cycle equipment, the present invention is not limited to this, and is also applicable to, for example, a refrigerator, a freezer, a heat pump water heater, and the like.

The invention claimed is:

1. A motor driving apparatus comprising:
a DC power supply circuit to apply a DC voltage of variable voltage value to DC buses;
an inverter to receive the DC voltage on the DC buses and apply an AC voltage of variable frequency and variable voltage value to a motor; and
a connection switching device to switch connection of windings of the motor, wherein
a transition is made from a first state in which a first connection is selected by the connection switching device, an output voltage of the DC power supply circuit is at a first voltage value, and a rotational speed of the motor is at a first speed value, to a second state in which the output voltage of the DC power supply circuit is higher than the first voltage value, the rotational speed of the motor is higher than the first speed value, and a current flowing through the motor is not greater than a predetermined threshold, and
in the second state, the connection switching device performs switching from a state in which the first connection is selected to a state in which a second connection is selected.

2. The motor driving apparatus of claim 1, wherein the switching by the connection switching device is performed in a state in which the current through the motor is made zero.

3. The motor driving apparatus of claim 1, wherein the switching is performed in a state in which the output voltage of the DC power supply circuit is set at a value corresponding to the rotational speed of the motor at a time of performing the switching.

4. The motor driving apparatus of claim 1, wherein the motor is a permanent magnet motor, and $$Vdc \geq \sqrt{2} \cdot \omega \cdot \Phi a$$

is satisfied, where Vdc is the output voltage of the DC power supply circuit at a time of performing the switching, ω is the rotational speed of the motor at the time of performing the switching, and Φa is an armature interlinkage flux of a permanent magnet at the time of performing the switching.

5. The motor driving apparatus of claim 4, wherein the armature interlinkage flux at the time of performing the switching is a greater of an armature interlinkage flux in the connection before the switching and an armature interlinkage flux in the connection after the switching.

6. The motor driving apparatus of claim 1, wherein after the switching, the output voltage of the DC power supply circuit is returned to the first voltage value, and the rotational speed of the motor is returned to the first speed value.

7. The motor driving apparatus of claim 1, wherein the DC power supply circuit has a function of rectifying an AC voltage from an AC power supply and a function of boosting the AC voltage.

8. The motor driving apparatus of claim 7, wherein the first voltage value of the output voltage of the DC power supply circuit is a value of a voltage output from the DC power supply circuit in a state in which the boosting function of the DC power supply circuit is inactive.

9. The motor driving apparatus of claim 7, wherein the DC power supply circuit further includes a smoothing capacitor to smooth the boosted voltage.

10. The motor driving apparatus of claim 1, wherein the connection switching device includes an electromagnetic contactor including an exciting coil and a contact driven by current flowing through the exciting coil.

11. The motor driving apparatus of claim 1, wherein the connection switching device includes a semiconductor switch controlled by a signal input to a control terminal.

12. The motor driving apparatus of claim 11, wherein the semiconductor switch is formed by wide-bandgap semiconductor.

13. Refrigeration cycle equipment comprising the motor driving apparatus of claim 1.

* * * * *